United States Patent
Hollenberg

Patent Number: 6,091,956
Date of Patent: Jul. 18, 2000

[54] SITUATION INFORMATION SYSTEM

[76] Inventor: Dennis D. Hollenberg, 364 Franklin La., Ventura, Calif. 93001

[21] Appl. No.: 08/873,965

[22] Filed: Jun. 12, 1997

[51] Int. Cl.[7] .................................................. H04Q 7/20
[52] U.S. Cl. ........................... 455/456; 455/566; 455/557
[58] Field of Search .................................... 455/432, 433, 455/435, 456, 556, 557, 558, 566, 12.1; 342/357, 454, 457; 340/825.47, 311.1, 905

[56] References Cited

U.S. PATENT DOCUMENTS

| | | | |
|---|---|---|---|
| 4,804,937 | 2/1989 | Barbiaux et al. | 340/52 F |
| 4,982,346 | 1/1991 | Girouard et al. | 364/550 |
| 5,045,861 | 9/1991 | Duffett-Smith | 342/457 |
| 5,052,943 | 10/1991 | Davis | 439/357 |
| 5,124,915 | 6/1992 | Krenzel | 364/420 |
| 5,173,691 | 12/1992 | Sumner | 340/905 |
| 5,182,555 | 1/1993 | Sumner | 340/905 |
| 5,184,314 | 2/1993 | Kelly et al. | 364/709.01 |
| 5,218,188 | 6/1993 | Hanson | 235/375 |
| 5,235,633 | 8/1993 | Dennison et al. | 455/456 |
| 5,313,200 | 5/1994 | Sone | 340/905 |
| 5,334,974 | 8/1994 | Simms et al. | 340/990 |
| 5,414,432 | 5/1995 | Penny, Jr. et al. | 342/357 |
| 5,465,038 | 11/1995 | Register | 340/2 |
| 5,504,482 | 4/1996 | Schreder | 340/995 |
| 5,504,589 | 4/1996 | Montague et al. | 358/403 |
| 5,524,081 | 6/1996 | Paul | 364/460 |
| 5,526,357 | 6/1996 | Jandrell | 370/95.2 |
| 5,539,395 | 7/1996 | Buss et al. | 340/825.47 |
| 5,559,520 | 9/1996 | Barzegar et al. | 342/357 |
| 5,561,704 | 10/1996 | Salimando | 455/456 |
| 5,566,226 | 10/1996 | Mizoguchi et al. | 455/566 |
| 5,589,838 | 12/1996 | McEwan | 342/387 |
| 5,694,335 | 12/1997 | Hollenberg | 364/514 C |
| 5,822,692 | 10/1998 | Krishan et al. | 455/557 |

OTHER PUBLICATIONS

Hollenberg, D. "Information Processing Systems" in *Encyclopedia of Computer Sci. and Tech.* vol. 26 supplement 6 (A. Kent & J.G. Williams(eds.)) Marcel Dekker NY, 153–162, 1990.

Gallagher, R. et al. "Beyond Reductionism" *Science* vol. 284(5411) pp. 79–109 Apr. 2, 1999.

D.J. Watts & S.H. Strogatz "Collective dynamics of small–world networks" Nature 393 Jun. 4, 1998 pp. 440–442.

Fist, Stewart "Cancer scare for cellphone users" *New Scientist* May 10, 1997 p. 4 (article).

08/613725 Hollenberg "secure personal applications network" (pat. application) Mar. 12, 1996.

*Primary Examiner*—Nguyen Vo
*Assistant Examiner*—Sam Bhattacharya

[57] ABSTRACT

A wireless system for providing services and time-critical information about places and events to mobile computers and their users proximate to their current locations or potential destinations within enclosed areas, urban landscapes, and open areas, including travel distances and transit times, entertainment, merchants' messages, area attractions, communications, current locations of system users, and traffic congestion information and user-generated information from bar-coded objects and digital photographs of scenes and other materials. Included is a combination low-radiation dosage-reception handset for wireless communications which includes bar-code reader and digital camera peripheral devices for mobile computers, a bracket for interfacing a mobile computer with radio to external systems, and methods for improving the operations of computer reception, search, and display of such information for the edification, efficiency, and enjoyment of computer users.

15 Claims, 9 Drawing Sheets

Fig. 10
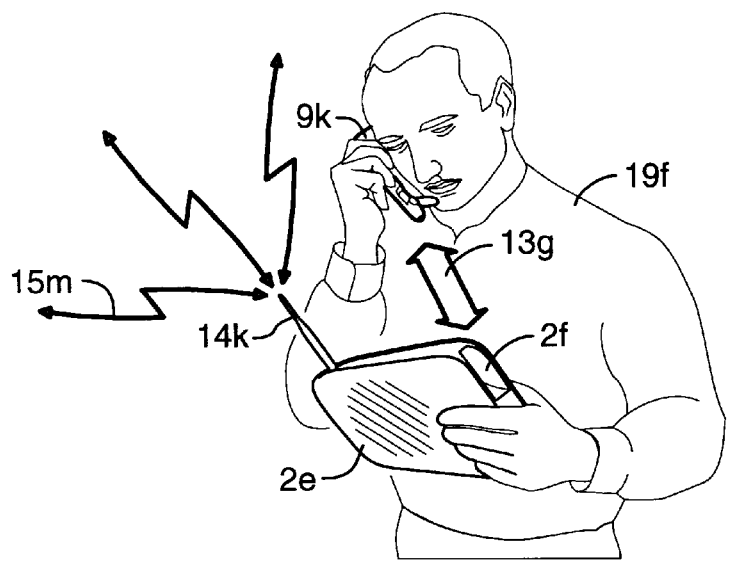
Fig. 11
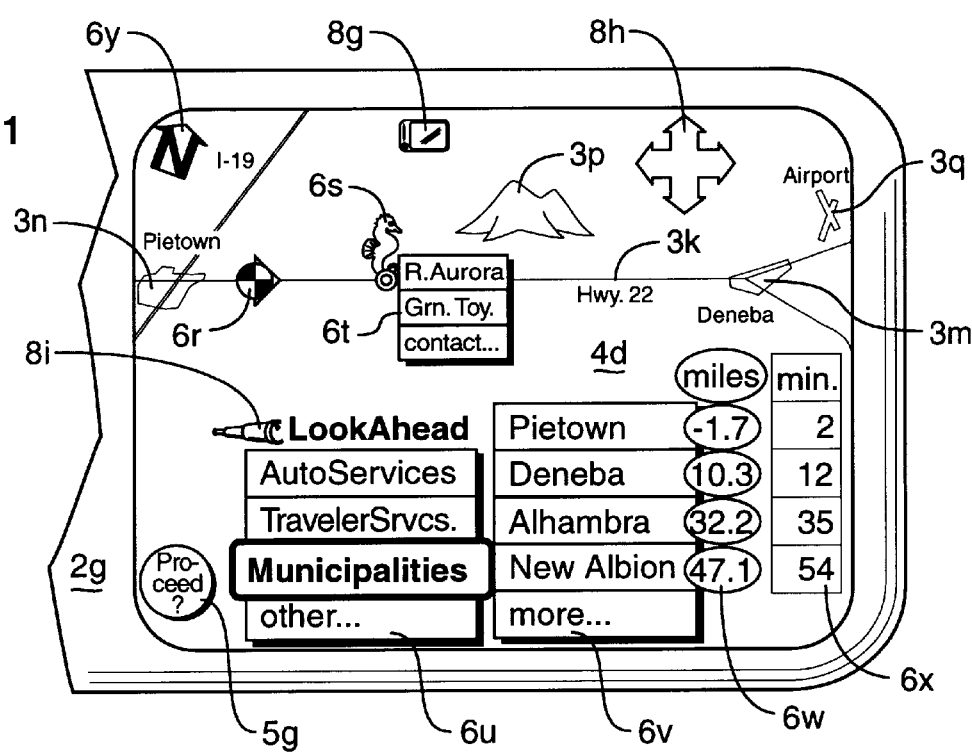
Fig. 12
| item ref. 29a | identifier 29b | location 29c | data type 29d |

SITUATION INFORMATION SYSTEM

BACKGROUND—FIELD OF INVENTION

This invention relates to distributed information systems, specifically those which exchange information about places, their events, and details with mobile computers and their users.

BACKGROUND—GENERAL DISCUSSION

Societal changes, marked by increasingly mobile life styles, greater work demands, and downsizing in business and government, have desocialized public environments by reducing people's free time. A consequence is that the lively marketplace atmosphere that once inspirited our city centers has generally been replaced by inhospitable spaces. For example, in cities only at lunch times do people fill the few open urban spaces to socialize and find diversion before returning to work. Most people in our increasingly connected society require communications access in order to conduct their daily business, access generally unavailable outside of buildings.

Environments providing accessible data communications resources would attract such people regularly since they could continue working on their projects. The presence of these workers would draw other visitors, some of whom might offer products or services or visit because of the interesting assortment of people reliably to be found there. Thus, after providing the seeding effect of appropriate communications services, modern-day marketplaces could again enliven our cities and towns. Such environments would provide a true sense of physical place which the Internet lacks. Businesses, potentially the best providers of such services, can't support them without payback, however.

While people's need for information that specifically fits their needs has increased, the availability, accessibility, and timeliness of this information, about specific places, events, and their details, called situations herein, have decreased. The current population is aging but, at the same time, continues to travel more than those of the past. Everyone, particularly senior citizens, need ready information concerning events, conditions, and services about a place, particularly when it's unfamiliar or one which they are about to visit, to be more secure and better able to enjoy it.

Similarly, people with physical challenges could function more freely in public places with the aid of a system which provided them with a specifically appropriate combination of aural, visual, and tactile information about their location. Having ready access to timely, proximate information, i.e., information particularly relevant to a user's location such as local services information, such as transportation-system routes and schedules identifying nearby stops and other services, would increase their traveling efficiency and safety.

Because people now have less time, shopping is taking a greater proportion of free time. Worsening the problem, many stores are cutting costs by reducing staffing and merchandise inventories. Shoppers searching for price or stock information in a store must now spend more time searching the isles for help in finding the merchandise they seek. Clearly, useful time-critical and specific information about stores' offerings—merchandise information—is increasingly out of reach.

With Internet (via the PC) and TV information competing for audiences, local retail stores increasingly find it expensive and difficult to advertise their inventories to their desired audiences. A system that leads the customer directly to the offered merchandise, occasionally calling the customer's attention to related or promoted items, would increase that store's sales volume.

In contrast to the diminishing availability of local information, world-wide information via the Internet is burgeoning. While users of the World-wide Web can get information about a specific product in a distant country, information about price and availability of a product at a local store is often frustratingly difficult to get. Once the product is located, the final shopping penalty is the time wasted in the cashier's line.

A partial solution to these problems is the ubiquitous portable telephone. However, the expense for using it for frequent inquiries about services and products would quickly grow exorbitant. An obvious problem, too, is the lack of an accessible and efficient telephone directory or database to quickly connect to the appropriate information source. Product pricing information often requires a barcode reader, i.e., a device for scanning the bar code, or universal product code (UPC), of a product, which is only available at the cashier's station. Too often such attempts to gain information results in wasted time.

Another problem with portable telephones is their potential for insidiously causing cancer in sensitive organs such as the brain. Because the radio frequency (rf) transmitter and antenna of the wireless telephone is the source of potentially cancer-causing electromagnetic wave radiation (EMWR) and is positioned near the head when the user telephones, the head area receives the highest radiation dose. An additional potential health hazard of such telephones is their suspected interference with cardiac pacemakers.

Lack of timely information about traffic congestion each year can cumulatively amount to several days taken from commuters' lives, as much as two weeks worth of eight-hour days in the largest cities, and, with fewer new highways under construction, the losses can be expected to rise. With better and more timely information about traffic, which includes aircraft, watercraft, etc., some traffic jams could be avoided. However, even after years of existence of the Intelligent Vehicle Highway System initiative, little improvement has been forthcoming. Currently, generally available traffic advisory information is limited to the airborne radio report which only functions after a traffic slowdown happens to be spotted. Any solution to this problem must be cheap, simple, and ubiquitous.

Timely and reproducible information about situations involving criminal acts would serve to reduce their numbers by deterring the perpetrators. For example, if cameras were commonly carried by people, the probability of perpetrators being photographed and identified increases. A digital camera built in to a portable computer device or telephone could share some of the circuitry to reduce the marginal cost of adding it. Such a camera could also serve to record travel scenes, copy documents, and, for the solution to be widely embraced, provide entertainment for users.

Information about places and their events, situation information, helps people to function closer to their potential. Such information resides available, but largely inaccessible because it lies unindexed and distributed in a plethora of largely local repositories. The lack of access to situation information is largely a technological problem the solution for which includes elements of business, the Internet, entertainment, communications, and computer technology. In order for a solution to be workable and universally embraced, it must also be distributed, put into the hands of average people.

BACKGROUND—DISCUSSION OF PRIOR ART

Finding the location of radios, including transmitters and transponders, through various methods including chronometrical, i.e., time measuring, triangulation is well understood. The U.S. Global Positioning by Satellite (GPS) System and the Russian Global Navigation Satellite System (GLONASS), collectively referred to herein as the satellite positioning system or GPS, are comparatively recent permutations of these methods which provide precise time signals for mobile receivers to compute their location. GPS signals are often obscured in environments of hills or tall buildings.

Methods of using rf signals from various sources for location finding are well known. McEwen U.S. Pat. No. 5,589,838 (1996) shows a mobile transmitter emitting pulse groups which are then triangulated by multiple stationary, self-gating pulsing receivers; the receivers must process large data sets in order to resolve each transmitter's location. Jandrell U.S. Pat. No. 5,526,357 (1996) shows a multilaterating communications system using mobile transponders for intercommunication and locating. Duffet-Smith U.S. Pat. No. 5,045,861 (1991) shows a method of determining the location of a roving receiver by way of computing the phase difference of multiple signals from multiple transmitters.

Methods using combinations of satellite and wireless communications for fleet operations include Barzegar et al. U.S. Pat. No. 5,559,520 (1996) which shows a vehicle routing system with GPS and an on-board locator control module with storage which provides modifiable route information, received data with location markers (which term, markers, is neither clear nor defined) and alarms to alert a central dispatcher of deviation from an defined, assigned route. Similarly, Schreder U.S. Pat. No. 5,504,482 (1996) shows a GPS navigation system with complex on-board digital map storage, interfaces to vehicle control systems, route processing to destination, etc. Paul U.S. Pat. No. 5,524,081 (1996) shows a system of GPS-signal-receiving vehicles with preloaded golf-course information and a base station which provides differential location correction and information specific to the vehicle's location on a golf course. However, with thousands of mobile transmitters, such as motor vehicles on crowded freeways, or widely ranging systems traveling to diverse destinations, the forementioned prior art would require unworkably large, difficult to update, on-board locator data modules or data bases. Such systems would suffer from the centralized nature of their information sources and would therefore be subject to complex data processing and data updating burdens which no ordinary user could perform as the logistics would be unworkable.

Other location-related prior art includes Penny, Jr. et al. U.S. Pat. No. 5,414,432 (1995) showing a locating transceiver with GPS optionally included in a portable radio which transmits a rescue message. Simms et al. U.S. Pat. No. 5,334,974 (1994) shows a mobile security system which transmits position information to a central console map and dispatcher for providing emergency service. Finally, Krenzel U.S. Pat. No. 5,124,915 (1992) shows a dedicated emergency information gathering system which provides information to a central analysis location. Such prior art systems address infrequent events as opposed to the need for continuing information flow in many people's daily lives.

Prior art addressing vehicle traffic congestion and navigation includes Sone U.S. Pat. No. 5,313,200 (1994) showing a centralized traffic congestion display system with directional arrows to indicate the location and direction of travel of the congested traffic. Sumner U.S. Pat. No. 5,182,555 (1993) and Sumner U.S. Pat. No. 5,173,691 (1992) show a messaging system and data fusion system, respectively, for an elaborate, centralized traffic congestion information system. Such systems, with their centralized information processing systems, prove expensive to build and maintain and are prone to failure. Barbiaux et al. U.S. Pat. No. 4,804,937 (1989) shows a wireless vehicle monitoring system for fleet operations which provides vehicle operational data to a central database.

Prior art relating to further aspects of subject invention include Montague et al. U.S. Pat. No. 5,504,589 (1996) showing a wireless ordering system for food service applications; Register U.S. Pat. No. 5,465,038 (1995) showing a recharging and data-transfer docking bracket which accepts a handheld computer; Hanson U.S. Pat. No. 5,218,188 (1993) shows a handheld data terminal with the capability to link with an rf communications computer; Kelly et al. U.S. Pat. No. 5,184,314 (1993) showing a mobile data communications terminal with docking bracket for an external antenna and keyboard interface to accept a handheld computer with rf communications capability; Davis U.S. Pat. No. 5,052,943 (1991) showing a recharging and data transfer bracket for receiving an elongate handheld computer; and Girouard et al. U.S. Pat. No. 4,982,346 (1991) which shows a fixed-location kiosk for retail-mall promotion applications. While the subject matter of the latter six prior-art exhibits pertain to aspects of subject invention, none provide the handheld computer and communications characteristics that a time and place-critical information system demands.

SUMMARY OF THE INVENTION

The Situation Information System relates to information communications between sources of timely information and one or more information users which also provide information to other users. Broadly stated, situation information pertains to information about events or conditions associated with places which the mobile user may encounter or consider visiting. It particularly includes events occurring or about to occur in a locus accessible to the mobile user and to which the user may arbitrarily choose to respond by visiting one or more of the events, avoiding them entirely, communicating them to another person, rectifying them, or otherwise modifying plans and itineraries in light of such events. Sources of situation information are databases of local information and information from users themselves. Additionally, the situation information system provides users with up-to-date map-tracking information relating their location to events and situations as well as enabling them to respond in a timely manner.

A comparatively simple area-data communications system operates using high frequencies at sufficiently low power levels to avoid interference with neighboring systems. For example, in substantially enclosed areas a system consisting of multiple transceivers transmit a query signal to mobile transponder devices included in handheld personal computing devices. When the transponder responds with its identification sequence, its location is then computed through chronometric triangulation based upon transponder signal arrival times at the system receivers.

In cities having "urban canyons" formed by tall, close buildings, Global Positioning System (GPS), meaning the global satellite positioning system such as GPS, GLONASS, or other systems, signals are further degraded by multiple-path interference and signal-acquisition failure. In such an environment transponders and receivers could use the rf signal from a satellite positioning system as a timing signal as the source of a gating pulse or trigger to coordinate their functions. In this mode, upon receipt of the satellite clocking signal, the transponder transmits its signal while, at the same instant, local receivers begin counting in order to quantify the elapsed time preceding their receipt of the transponder signal emitted by the device. Thus, device and transponder location is then calculated chronometrically from the elapsed time, net of internal device delays, etc., at each of multiple triangulating receivers. In these location-finding systems, position resolution to within a few feet is possible in an otherwise obscuring topography.

In the preferred embodiment, a situation information system consists of at least one mobile computer with multiple transmitters and receivers, i.e., radios, a known-location information service provider including one or more radios, accessible network, computer equipment with memory, which term includes storage, drives, and RAM units, and computer programs to provide for efficient situation information exchange between them. The mobile computer's transmitters and receivers include a receiver for satellite positioning system signals, such as GPS or GLONASS, a transceiver for wireless voice and data telecommunications capability, and a transponding transceiver for location finding in topographically complex, that is, mountainous areas or areas surrounded by buildings, e.g., in urban "canyons" and those enclosed within buildings, such as shopping malls.

These radios can be produced in the form of multiple frequency radios to reduce cost and size, by requiring only a single set of components, and function as many different radios depending upon their operating parameters. Alternatively, increasing capacities of the digital signal processor (DSP), currently lead by a chip capable of performing up to 1,600 million instructions per second, augurs the coming of so-called software radios in which virtually all rf processing functions will be performed in solid-state devices such as silicon-on-insulator (SOI) methods. In the next few years wireless telephones with software transceivers appearing on the market will offer selectable protocols and frequencies for GSM, CDMA, PCS, etc. Smart antennas will continue to improve and provide greater selective directionality to further enhance the efficient use of rf spectrum, which, along with the advantages of digital communications, promises to provide an abundance of channel capacity.

One such transceiver of subject invention provides voice communications which, because it is desirable that the form factor of the situation information device provide a usefully large display or graphical display unit (GDU), which term includes all forms of sensory media such as tactile and aural as well as visual, and militates against an integral telephone ear piece or telephone speaker and a telephone mouth piece or telephone microphone, separate the foregoing parts from the rf processing section in the form of a separate handset. The handset, removably stored in or upon the case of the situation information device, contains the aforementioned speaker and microphone components and is connected to the rf section by an extendible cord attached to a reel. The handset may alternately communicate to the radio section of the situation information device by way of a photonic link, which includes an infrared (IR) media link, providing the microphone and speaker signals are appropriately converted by analog-digital and digital-analog techniques, respectively.

Although the small form factor customary of mobile telephones is sacrificed in the aforementioned arrangement, other benefits accrue to users of subject invention. First, because the handset is physically removed from the rf antenna of situation information device when in use, rf or EMW radiation to the head is reduced considerably. By holding the combination display unit and radiative transmitter and antenna away from the body—at arm's length, if convenient—harmful radiation exposure is reduced by at least two orders of magnitude. Radiation intensity varies in inverse proportion to the square of the factor of difference in the distance. Thus, by moving the rf transmitting antenna from about two inches from the brain, as it is in integrated-unit mobile telephones, to twenty inches away, radiation exposure to the organ is reduced to a mere one per cent of the original intensity.

Secondly, to increase the situation information capability of the system, peripheral devices such as a bar-code reader and a digital camera, which term, peripheral devices, also includes keyboards, printers, and other input/output equipment. The digital camera, because of the decreasing size of its components, for example, the lens and the resulting tiny aperture, can serve to copy documents and can be fit into the handset. In such a configuration, these peripheral devices can share electronic components such as computer central processing unit, DSP unit, memory, storage, and rf units, as appropriate, to avoid cost and space requirements of their duplication. Included also is a wireless, meaning all photonic media such as infrared, data interface for wirelessly connecting to peripheral devices, including the aforementioned handset, or suitably equipped computers such as the desktop personal computer (PC).

Subject invention would prove useful to, for example, visitors driving into an unfamiliar city. They would want to know about hotel accommodations and restaurant offerings in the city as they approached it. While reviewing the hotel situation information, for example, their electronic map would show traffic congestion forming in their path and they may choose to take a more immediate exit in order to avoid congestion. They would review hotels having vacancies and special offers in their price range and negotiate reservations by telephone or electronic mail (e-mail). Additionally, the visitors could arrange their stay's agenda by reviewing the area's attractions and entertainment offerings while homing in on their chosen hotel using the digital map which would show their position relative to their goal. As they approached their hotel, the map display would zoom in to reveal increasing detail, ultimately positioning them at the hotel's entrance. Upon their arrival and because the staff, using their hotel computer, would be able to monitor the visitors' progress, the visitors could be greeted by name.

Removed from its bracket mounted inside their automobile, the visitors could carry their situation information device with them as they explore the city on foot and use it to learn about the city as they approach historical sites and attractions. While visiting a department store, one visitor could take a digital photograph of the other modeling a potential clothing purchase using the camera built into their situation information device. The trial fitting and photographing might continue at other stores so that the fit of the clothes from different stores can be viewed on the display and compared later. Next they might visit an attraction in the area such as a zoo or wildlife preserve and use the bar-code reader built into their situation information device to search and receive additional information about plants, animals, environments, and histories of specimens they encounter. Similarly, they could enter and record the organisms' names and natural histories into their device as they photograph them.

The same visitors the following day at the department store could use their situation information device to search the store's gift suggestions to choose presents to give to their grandchildren upon their return home. Their indicated position, which is conveniently tracked for them on the store's floor plan shown on their display, would speed them on their way to the various items they've selected for viewing. The bar codes of those items selected could then be scanned into their device, as well as that of the chosen clothing article, and, with their charge-card information transmitted automatically to the store's system and verified, the transaction could be completed with dispatch.

Such a system, which allows the store to provide its information and message to potential customers who are opportunely traveling nearby, stands a better chance of enticing them to visit: getting a customer who is driving along a nearby street into the store is easier than motivating him or her to leave home or work, get in the car, endure traffic, find parking, etc.

Further, a networked store could benefit by directing employees' activities to more profitable tasks like providing better customer service, for example. Extending the idea further, a customer possessing a device with a communication link to information from the store's product database, a terminal device for querying the database, and a bar-code reader, could shop for merchandise without the assistance of store personnel. With appropriate prior credit arrangements, the shopper could collect and price his or her merchandise, electronically execute the charge instrument for the purchased items, and exit.

In such a scenario, a local extranet and customer-carried display device could provide a new type of promotion and advertising medium. For example, knowing a person's location, the networked store could increase customer traffic by transmitting special offers directly to the willing customer's device. An additional benefit is that customers can receive services like maps and other aids to help them find their way around the store or shopping mall to the desired merchandise or store, respectively.

Situation information devices could also provide additional digital information services such as electronic mail, entertainment, games, news, television, particularly digital TV, and access to other networks, including the Internet, for example. The requisite services could also be provided by a store, a restaurant, or a shopping district association to promote a steady clientele.

Subject invention also a provides a resource for foreign or physically impaired visitors who lose their way in an area without situation information services is a device with which they could transmit a digital photograph of their location to local authorities who, after identifying their location, could orient them. Alternatively, the posts of street signs could carry an appropriately located bar code label which, when scanned with a bar-code reader, would instantly reveal the reader's location and the names of nearby streets, etc. A mobile computer and wireless telephone with peripheral devices built-in, such as a telephone handset, a digital camera, and a bar-code reader would enhance visitors' exploration and enjoyment of an area.

With camera and bar-code reader combined with the telephone handset, users would require a single element to perform all three functions. Also, many of the same electronic components could provide function to each of the peripheral devices, for example, the digital computer could provide much of the digital processing for the peripheral devices. The housing of a usefully large display could also provide convenient attachment for the removable telephone handset with integral camera and bar-code reader. Further, the radio transmitter section of the wireless telephone could be separated and located within the display section; the transmitter would then communicate with the handset through retractable wire or a wireless link such as infrared.

Area services and public safety personnel could do their jobs faster and more effectively with a ready source of situation information at their fingertips. For example, traffic congestion and emergency-situation information can be provided to approaching motorists and distant emergency decision makers, respectively, by those on the scene equipped with camera and communication capabilities. Digital photographs or video recordings of the scene could be quickly transmitted to those who evaluate emergency-situation information. In the case of vehicular traffic congestion, the vehicle's location, speed, and travel-direction data could be collected and redistributed as real-time, graphical, traffic-situation information. Thus, vehicle operators could avoid traffic situations that lay in their paths. Motorists encountering accidents could transmit digital photographs to the emergency-response dispatch center. Accident victims could also record traffic-accident details, drivers involved, drivers' identification, license-plate numbers, etc., as corroborating visual information.

In yet another embodiment of subject invention the situation information device would connect to external systems, that is, systems which are substantially external to the situation information device, such as electrical power from the vehicle's electrical system, exterior antennas, vehicle digital network, and other peripheral devices like a keyboard. For example, after driving to the shopping area users connect to peripheral devices enabling them to send and receive e-mail, print files, etc.

In yet another embodiment of subject invention is a distributed system of information service providers which provide data about geographical features, services, and attractions in their local area and transmit that data to mobile devices for display. Data such as mileage to various municipalities, services, and attractions using a location-specific information sequence for fast transmission to mobile devices which display the mapped information, compute distances from the mobile device's current position, etc. Each feature is identified by a code or byte sequence containing fields for the name, global location, and if applicable, Universal Resource Locator (URL), as well as variables for formatting and graphical symbol to be displayed or otherwise executed, aurally, for example. In operating such a system, users of mobile devices with narrow bandwidth, i.e., slow communications devices, could receive the important subset of mapping elements for a given area quickly. For example, they could receive elements such as main roads and cities and the separation, i.e., mileages and transit time, between them with which their mobile device could compute their mileage and the estimated time before arriving. Also, the mobile device itself could store standard graphical symbols for even more rapid display of such map features in the locations specified by the downloaded mapping information. Devices could then download additional information, including detailed maps, from the information provider should that be required.

Objects and Advantages of the situation information system:
  a system for providing mobile users with time-critical situation information.
  a system for providing mobile users with geographic location information, such as corrected by differential GPS.

a system for providing mobile users with a multiple-function device to generate time-critical situation information, such as that pertaining to traffic congestion, events, and emergencies, for themselves or for others at other locations.

a system for providing situation information, such as area maps, other users' current locations superimposed on an area map, and transportation schedules, to enhance the efficient mobility of the physically impaired and others.

a situation information system which provides local or proximate information, such as merchant's advertising messages, merchandise offers, and tourism site information, according to mobile users' location.

an information system with which a shopper can better serve himself or herself by, for example, determining product availability by querying a store's inventory, determining the price of products using a handheld multiple-use electronic device which includes a bar-code reading device, and electronically paying for the selected merchandise without requiring assistance from store personnel.

a system for merchants, acting on a short-term basis, to communicate special offers to customers in order to increase store traffic, reduce inventory, and increase sales.

a system for collecting a facsimile of local situation information, such as a local scene, printed materials, or graphical information, using a multiple function system which includes a digital camera.

a system in which bar-code information posted in various places in an area, one without other available locating means, is used to orient visitors to the area and aid in determining their location.

a system for providing situation information produced by a digital camera and bar-code reading device transmitted by a wireless transceiver for displaying on the user's graphical display or communicating to another device.

a system for generating situation information for vehicles derived from GPS or other peripheral device for transmission to another user for displaying on an associated graphical display.

a system for locating a transponder using a satellite positioning system time signal as gating pulse for subsequent position determination by other receivers.

a situation-information collecting and processing device for use in a vehicle which can be detached from the vehicle's systems and operated by a pedestrian user.

a system for providing situation information received from a wireless telephone with its antenna and transceiver mounted in a handheld computer and display unit and the telephone's microphone and speaker mounted in a separate, but communicatively linked, handset unit with other peripheral devices such as a digitally copying camera device and bar-code reading device.

a computer system which includes a wireless telecommunications device, the handset of which is separate from the rf transceiver and can be securely attached to the computer device when not being used.

a distributed information system for mobile users which provides local area information, for example, map, travelers' services, and geographical features information, in a concise form suitable for rapid download and display on the user's mobile device.

a mobile information system with which users could represent themselves on other user's computer displays with graphical symbols which could also be executable computer code to provide animation, sound, etc.

a wireless telephone that greatly reduces radiation exposure to the user's head area consisting of a handset, which encompasses the telephone microphone, speaker, and appropriate electronics circuitry, spatially separate from but communicatively linked to its rf transceiver by a retractable cord or infrared (IR) transceivers.

a situation information system which automatically and serially downloads from one or more selectable lists of one or more information sources or sites into memory, including storage, for viewing on later demand concurrently with the user employing information, for example, by viewing or hearing, from a previously downloaded site.

an on-line information system in which users' customary information-source selections, such as electronically accessed sites catalogued on one or more visit lists, are automatically retrieved while the user is using or viewing information from a site downloaded earlier in the session.

an on-line information search system in which users' interests, entered as lists of keywords or search terms, are automatically searched for their occurrence on each site serially downloaded from visit lists, and sites containing keywords are themselves automatically downloaded, while the user is using or viewing information from a site downloaded earlier in the session.

a mobile on-line information system in which a user can select geographically ordered information sources, which are advanced from the user's current location and have no other relationship to it, and choose to visit on the basis of the current events at that location.

an on-line system providing users with a method of locating one another in an area through the use of unique user location and direction symbols.

an on-line system that provides a sense of place in contrast to the Internet's abstract nature and lack of physicality.

DRAWING FIGURES

The breadth of the situation information system is reflected in the many possible embodiments which take their form in various parts and arrangements of parts. The following drawings are provided for the purpose of illustrating its many aspects and embodiments and should not to be construed in any way as limiting.

FIG. 10 is a perspective drawing of the use of a situation information device with separate, photonically linked handset for telecommunications in which the user simultaneously refers to information displayed by the situation information device.

FIG. 11 is a diagram of the display portion of an exemplary situation information device showing the look-ahead function displaying map elements of a given local area.

FIG. 12 is a diagram of the mappable hypertext code sequence for displaying rapidly mappable and executably selectable information, individually called mappable hypertext items, to a mobile device for display.

Figure 1:
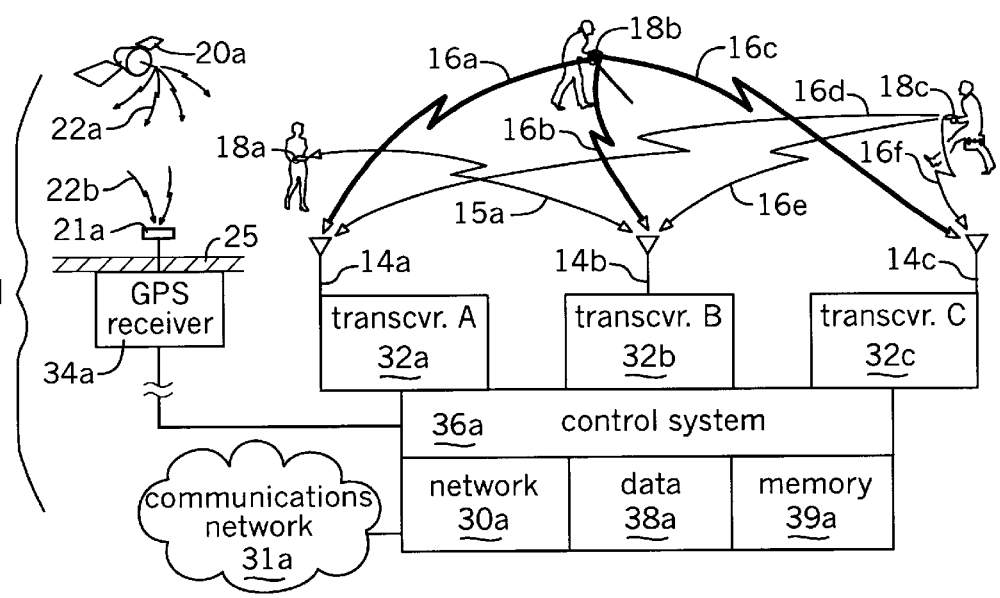
FIG. 1 is a diagram of the main components of a wireless situation information system for physicallt defined environments such as shopping areas.
Figure 2:
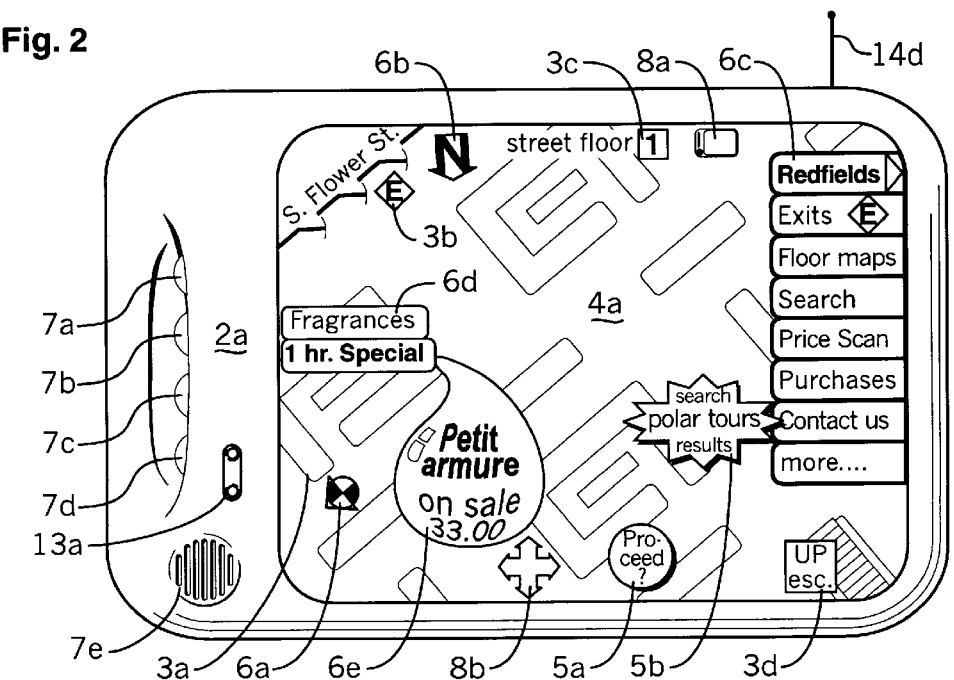
FIG. 2 is a diagram of a basic situation information device with graphical display showing an exemplary retail-store floor plan and other graphical situation information elements.

Description of situation information system basic alternate embodiment in FIGS. 1 and 2:

Referring now to FIG. 1 which shows an alternative embodiment of a situation information system used in a defined environment such as a shopping area in which can be seen rf antennas 14a, 14b, and 14c, the locations of which are known, and which generally transmit and receive information from mobile computers 18a, 18b, and 18c. Specifically in FIG. 1 antennas 14a through 14c are shown receiving information 16a, 16b, and 16c as well as 16d, 16e, and 16f from mobile computers 18b and 18c, respectively, to provide services from the service provider including finding the locations of the aforementioned mobile computers and receive information requests. In addition, antenna 14b is shown transmitting and receiving information 15a to and from mobile computer 18a. Antennas 14a, 14b, and 14c are connected to control system 36a by way of transceiver-A 32a, transceiver-B 32b, and transceiver-C 32c, respectively. Control system 36a is connected to data and memory components 38a and 39a, respectively, and to other systems including global communications network 31a by way of computer network 30a. In addition, control system 36a receives precise time signals from satellite 20a by way of satellite information transmission 22a, information reception 22b, satellite rf antenna 21a, and GPS receiver 34a; satellite rf antenna 21a is shown located outside the building structure 25 to receive satellite information.

The service provider includes transceivers 32a, 32b, and 32c, antennas 14a, 14b, and 14c, GPS receiver 34a, GPS antenna 21a, control system 36a, network 30a, data 38a, memory 39a, and communications network 31a. The radio locating instrument signaling function is shown operating on two devices, 18b and 18c. That of mobile device 18b is provided by satellite 20a, satellite information transmission 22a, satellite information reception 22b, satellite antenna 21a, GPS receiver 34a, severally either mobile computer 18b or 18c, information 16a, 16b, and 16c or information 16d, 16e, and 16f, respectively, antennas 14a, 14b, and 14c, transceivers 32a, 32b, and 32c, and control system 36a.

FIG. 2 shows a basic alternate embodiment of a situation information device 2a which is a handheld computing and wireless communications device with control programs specific to a situation information system such as that shown in FIG. 1, device 2a includes a touch-screen graphical display unit 4a, controls 7a, 7b, 7c, and 7d provide user-modifiable control for device 2a power, display 4a contrast, brightness, and speaker 7e loudness, respectively, speaker 7e, IR transceiver 13a for communication with other devices, and rf antenna 14d. Aforementioned graphical display unit 4a shows information including retail-store floor-plan proximate information station 3a, floor-plan information feature exit symbol 3b, floor description information 3c, and escalator symbol 3d, visit list program control icon 5a, and service provider search hit icon 5b, device location and direction symbol 6a which symbol can be a mappable hypertext item that the user may executably select in order to receive additional information or execute computer code associated with it as described in FIG. 12 below, north direction symbol 6b, service provider menu 6c, proximate station banner 6d, proximate merchandise banner 6e, which may be made to appear animated, the latter three of which may also be mappable hypertext items, device control icon 8a, and display scroll icon 8b. Additionally, symbols of other devices, such as other device symbol 6s in FIG. 11, which indicate their users' locations through the use of a graphical symbol may be shown in their appropriately mapped locations on display 4a.

Operation of the situation information system basic alternate embodiment shown in FIGS. 1 and 2:

Referring to FIG. 1 in which is shown two modes of operation of subject invention, the first mode, location finding, occurs in which transceivers 32a, 32b, and 32c are time-calibrated and synchronized by means of precise timing signals introduced to control system 36a, such as from satellite 20a via information transmission 22a, information reception 22b, satellite rf antenna 21a, through building structure 25 to GPS receiver 34a and thence to control system 36a. One of transceivers 32a, 32b, or 32c, on an optionally rotating basis or other scheme, periodically transmits a gating pulse, via antennas 14a, 14b, and 14c, respectively, to a transponder (not shown) located in each of situation information devices 18a, 18b, and 18c, such as device 2a in FIG. 2, each of which transponders subsequently respond to the received gating pulse by transmitting an rf signal such that the differences in arrival times of which the signal at each of the aforementioned antenna-and-transceiver pairs are used to compute the intersections of each envelope of distance of each of the transponder containing devices from each of the antennas and the location of each of the aforementioned devices thereby.

Accompanying each of the transponder signals is an identification code which uniquely identifies its device by means of which the location of each user is determined and identified by the situation information service provider. The user's location coordinates are then transmitted to the user's device for incorporation into display-program variables (not shown) and presented appropriately on display 4a in FIG. 2. Additionally, the service provider may wish to gather marketing and traffic data in order, for example, to determine the effect of certain merchandise or other displays on traffic patterns, speed, frequency of visitation, duration of viewing, etc.

The second mode of subject invention's operation, that of providing situation information services, occurs in which the location of the mobile situation information device 18a, being updated in service provider memory 39a, is correlated with proximate information to be transmitted, user-provided filters and options (shown in FIG. 14, below), and requested information from, depending upon the requested information's nature and location, data 38a, network 30a, and communications network 31a. Certain information device users, such as that of device 18b used by a physically impaired user, may require alternatively conveyed information, such as that which is verbally or tactilely conveyed from an appropriately configured device.

The basic embodiment situation information device 2a shown in FIG. 2, having been connected or logged on to the service provider's system in FIG. 1 and the device's position being known by the information system of FIG. 1, i.e., residing in memory 39a, operates by receiving information via antenna 14d, conveying the information to the user via display 4a and speaker 7e, the characteristics of which information can be changed by the user via controls 7a through 7d. As the user's location, shown on the display by device location and direction symbol 6a, approaches within a selectable distance of proximate information station 3a, proximate station banner 6d appears on display 4a, followed by proximate merchandise banner 6e to call user's attention to, for example, a short-term offer of merchandise which, as mappable hypertext items, may be executably selected by user to provide additional information or execute as computer code as described in FIG. 12 below. User may orient himself or herself globally by north direction arrow 6b, within the building by floor information 3c, within the floor by exit symbol 3b near exit doors to street named on a map, and floor plan details such as escalator symbol 3d. Additionally, user may change or scroll the portion of floor plan in view on display 4a by pressing, or executably selecting, the appropriate arrow of display scroll icon 8b to move the view in that direction.

The user may optionally access other service provider functions by selecting from service provider menu 6c, other device functions, e.g., e-mail, by selecting device control icon 8a, conduct a search of current service-provider information and which results appear on display 4a by search hit icon 5b which is shown positioned adjacent to menu item "Contact us" which serves to implement retrieval of the desired information, or enter information through unattached peripheral devices (not shown) such as keyboards which may communicate with device 2a via IR transceiver 13a. User may optionally download other information from a prepared list of sources automatically while viewing the information currently shown on display 4a and view the other (see FIG. 13), subsequently received information by executably selecting visit list control icon 5a causing the computer to proceed in processing or executing the pertinent information or code.

Figure 3:
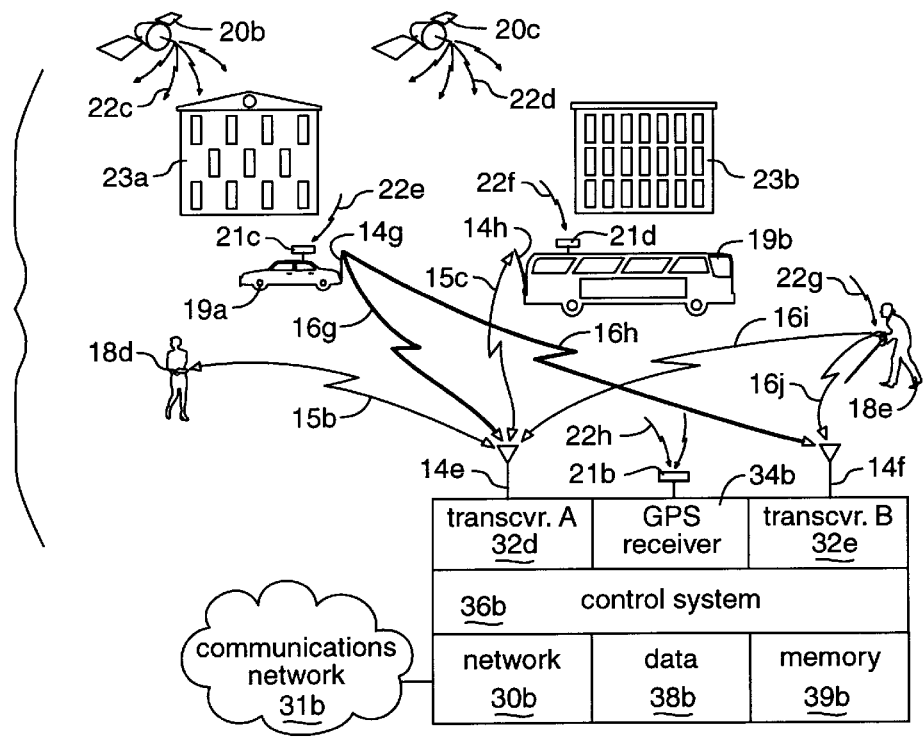
FIG. 3 is a diagram of the main components of a wireless situation information system for topographically irregular environments, including those in cities.
Figure 4:
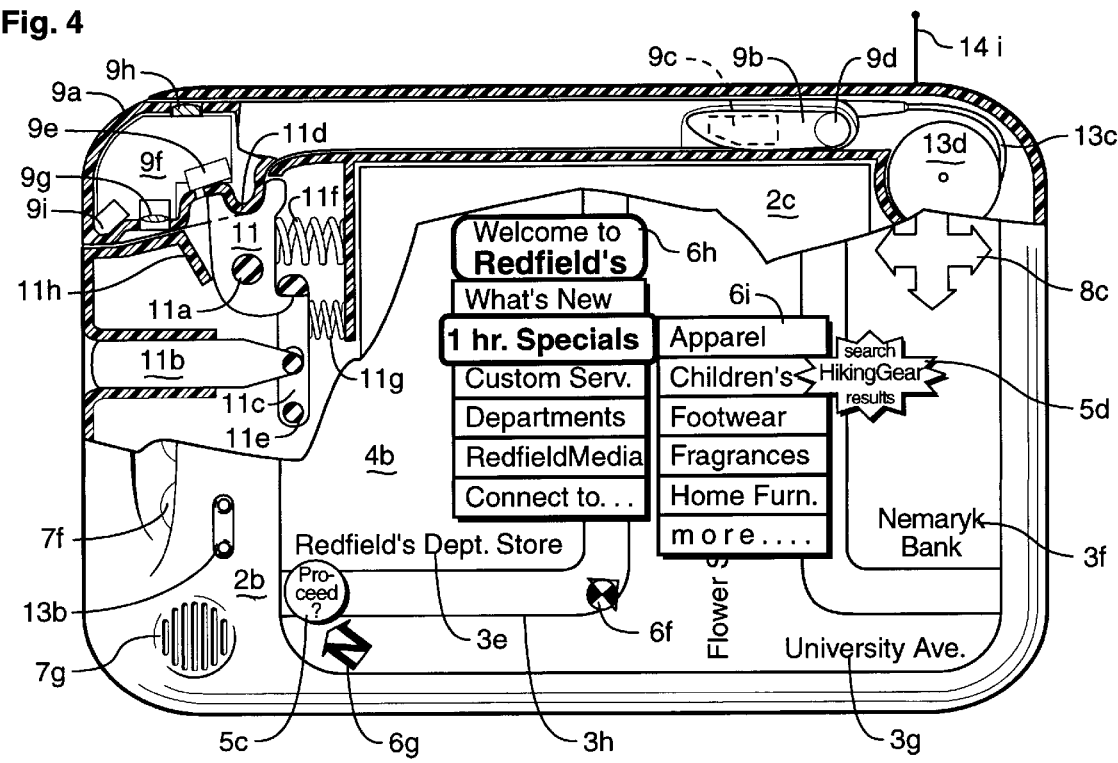
FIG. 4 is a diagram of a situation information device which includes multiple peripheral devices such as an enclosed telephone handset with digital camera and bar-code label reading device, exemplary display showing an urban plan, and other graphical situation information elements.
Figure 7:
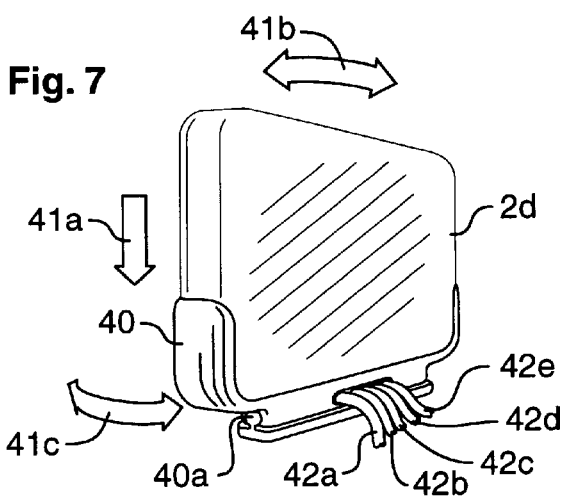
FIG. 7 is a perspective drawing showing the rear view of a situation information system connected to a fixed-services bracket for use in a vehicle or building.
Figure 8:
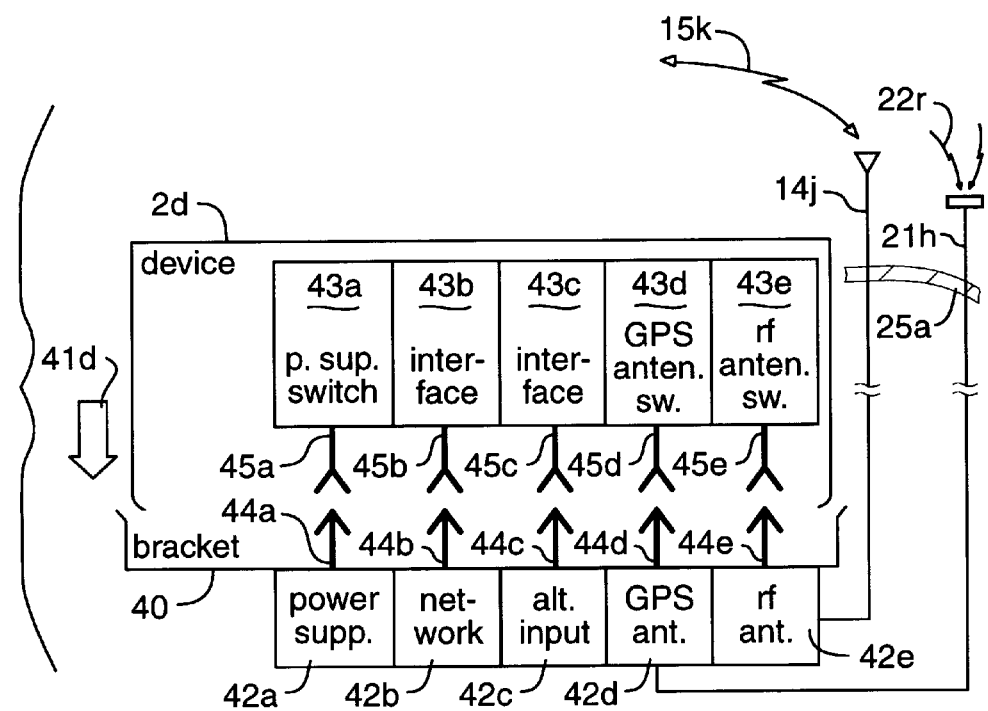
FIG. 8 is a diagram of the major connection components of a situation information device and fixed-services bracket in an exemplary vehicle installation.

Description of situation information system alternate embodiment in FIGS. 3 and 4:

Referring now to FIG. 3 which shows a situation information system used in environments of irregular natural or man-made topographic relief such as canyons and cities, respectively, in which can be seen rf antennas 14e and 14f of known location which generally transmit and receive information to and from pedestrian mobile situation devices 18d and 18e and vehicle mobile devices 19a and 19b, the distinction in mobile devices being that the latter is carried in a vehicle as shown in FIGS. 7 and 8. In the figure, antennas 14e and 14f are shown receiving information 16g and 16h, from vehicle mobile device 19a, and 16i and 16j, from pedestrian mobile device 18e, to provide services from the service provider including finding the locations of mobile devices, similar to device 2b in FIG. 4, and receive information requests. In addition, antenna 14e is shown transmitting and receiving information 15b and 15c to and from pedestrian mobile device 18d and vehicle mobile device 19b, respectively. Antennas 14e and 14f are connected to control system 36b by way of transceiver-A 32d and transceiver-B 32e, respectively. Control system 36b is connected to data and memory components 38b and 39b, respectively, and to other systems including global communications network 31b by way of computer network 30b. In addition, because topographical features 23a and 23b interfere with ground-level reception of sufficiently diverse GPS signals for reliable position determination, the aforementioned mobile devices function as transponders, signals from which devices are gated by one of the available satellite rf signals. Thus, control system 36b selectively receives accurate time and transponder-pulse gating signals from either satellite 20b or 20c by way of satellite information transmission 22c or 22d, respectively, information reception 22h, satellite rf antenna 21b, and GPS receiver 34b. In addition, vehicle mobile devices 19a and 19b are shown receiving the aforementioned time and gating signals via information reception 22e and 22f, respectively. Pedestrian mobile device 18e also receives the same information signals via information reception 22g through the device's built-in antenna (not shown).

The service provider includes transceivers 32d and 32e, antennas 14e and 14f, GPS receiver 34b, GPS antenna 21b, control system 36b, network 30b, data 38b, memory 39b, and communications network 31b. The radio locating instrument signaling function is shown operating on two devices, 19a and 18e. That of vehicle mobile device 19a is provided by satellite 20b or 20c, satellite information transmission 22c or 22d, respectively, satellite information reception 22e and 22h, satellite antennas 21b and 21c, GPS receiver 34b, vehicle mobile computer 19a, antenna 14g, information 16g and 16h, information 16i and 16j, antennas 14e and 14f, transceivers 32d and 32e, and control system 36b. The radio locating instrument signaling function of pedestrian mobile device 18e is provided by satellite 20b or 20c, satellite information transmission 22c or 22d, respectively, satellite information reception 22g and 22h, satellite antenna 21b (pedestrian mobile device antennas are not shown), GPS receiver 34b, pedestrian mobile computer 18e, information 16i and 16j, antennas 14e and 14f, transceivers 32d and 32e, and control system 36b.

FIG. 4 shows alternate embodiment situation information device 2b which is a handheld computing and wireless communications device with control programs specific to a situation information system such as that shown in FIG. 2. Device 2b includes a touch-screen graphical display unit 4b, device control 7f, speaker 7g, IR transceiver 13b for communication with other devices, and rf antenna 14i.

Graphical display unit 4b shows information including such as proximate information station retail store 3e, information features such as bank 3f, street name 3g, and sidewalk curb 3h, visit list program control icon 5c and service provider search hit icon 5d, device location and direction symbol 6f, north direction symbol 6g, service provider menu 6h, sub-menu 6i, which two menus are mappable hypertext items that the user may executably select in order to receive additional information or execute computer code associated with them as described in FIG. 12 below, and display scroll icon 8c. In the cut away portion of device 2b can be seen electronics enclosure 2c and telecommunications handset 9a which includes components such as extendable mouthpiece 9b, microphone 9c (shown in phantom), and mouthpiece hinge 9d, ear piece speaker 9e, digital copying camera 9f, camera lense assembly 9g, camera operation button 9h, and bar-code reader 9i. Handset 9a is secured by integral handset lip lid within the housing of device 2b by latch 11 which rotates around pivot pin 11a and handset 9a is urged from the housing of device 2b by the user-initiated action sequence of depressing release button 11b which retracts locking device 11c as it rotates around lock hinge 11e against the force of spring 11g allowing latch 11 to rotate relatively outwardly due to the urging of compressed spring 11f and stop against stop 11h after partially ejecting handset 9a from the housing. Handset 9a is electrically connected to device 2b by way of cord 13c which is extendably stored on spring-loaded (not shown) retracting reel 13d.

Operation of the situation information system alternate embodiment shown in FIGS. 3 and 4:

Referring to FIG. 3 which shows two modes of operation of subject invention, the first mode, location finding, occurs in which transceivers 32d and 32e are coordinated with local information devices and prepared to receive transponder signals by receipt of the pulse-gating timing signal introduced to control system 36b from appropriate satellite 20b or satellite 20c via information transmissions 22c or 22d, respectively, information reception 22h, satellite rf antenna 21b to GPS receiver 34b. Vehicle mobile situation information devices 19a and 19b and pedestrian mobile situation information device 18e receive pulse-gating signals from one of the satellites via information reception 22e, 22f, and 22g, respectively, and each of the devices subsequently responds by transmitting an rf signal such that the differences in arrival times between receipt of the satellite signal and the transponder signals at each of the antenna and transceiver pairs are used to chronometrically compute the intersections of each distance envelope pertaining to the separation of each of the transponder-containing mobile devices from each of the antennas and, hence, determining the location of each of the situation information devices. Accompanying each of the transponder signals is an identification code which uniquely identifies each device by means of which the location of each user is known and identified by the situation information system. The user location coordinates are then transmitted to the user's device for incorporation into display-program variables (not shown) and presented appropriately on the display as location and direction symbol 6f. Additionally, the service provider may wish to gather marketing and traffic data in order, for example, to determine the effect of certain merchandise displays, signs, or media presentations on traffic patterns, speed, frequency of visitation, duration of viewing, etc.

The second mode of subject invention's operation, that of providing situation information services, occurs in which information transmission pertaining to the location of pedestrian mobile situation information device 18d and vehicle mobile situation information device 19b, being updated in service provider memory 39b, are correlated with proximate information to be transmitted, user-provided filters and options (shown in FIG. 14, below), and response to user-requested information from, depending upon the requested information's nature and location, data 38b, network 30b, or communications network 31b, or combination thereof. Certain information service users, such as device 18e being used by a physically impaired user, may require alternatively conveyed information, such as verbally conveyed information or, for example, from a device having a tactile surface consisting of a dynamic bed of changeable, flat-top pins for conveying information tactilely (not shown).

The basic situation information device 2b shown in FIG. 4, having been connected or logged on to the system and its position being known by the situation information system of FIG. 3, operates by receiving information via antenna 14i, conveying the information to the user via display 4b and speaker 7g, the characteristics of which can be changed by the user via controls including control 7f. As the device user's mapped location, shown on the display by device location and direction symbol 6f, approaches within a selectable distance of environment proximate information features, such as retail store site 3e, an advertising message such as service provider menu 6h, or an optional advertising message (not shown), would appear on the display awaiting the user's request for information or services. This operational description assumes the user has initiated a service-provided keyword search for information about "Hiking Gear". Should the user also wish to know, for example, what the merchant's current, short-term offers are, the user would select the menu portion entitled "1 hr. Specials" which causes sub-menu 6i to appear on the display showing categories of merchandise included in the aforementioned offers. Search hit icon 5d, with "Hiking Gear" message which is similar in use to that of search hit icon 5b above, is shown overlapping the portion of the submenu entitled "Children's" which indicates that a 1 hr. Special in the Children's Dept. offering Hiking Gear is currently in effect. The system user, indicated by device location and direction symbol 6f and which may be a mappable hypertext item as described below in FIG. 12, may orient himself or herself globally by north direction arrow 6g, by building occupant information such as store 3e and bank 3f, by street name 3g on map, and sidewalk curb 3h. User may elect to receive information from other service providers by operating a visit list program (shown in FIG. 13), in which case, executably selecting visit list control icon 5c would cause the first site's information to be presented on the display. Additionally, the user may change or scroll the portion of map in view on the display by pressing the appropriate arrow of display scroll icon 8c to move the view in the arrow's direction.

Referring still to FIG. 4, handset 9a is released from latch 11 by the depression of latch release button 11b which causes the latch to deploy handset 9a by urging integral lip 11d relatively outwardly as described above. Handset 9a may be used for multiple functions including voice communications by initiating telecommunications operations through selecting the appropriate display-based menu group (not shown), speaking through speaker 9c in mouth piece 9b, which, urged by spring (not shown), deploys rotationally about pivot 9d as handset is deployed from device housing as the user pulls relatively outwardly against retractile force of spring-loaded (not shown) reel 13d acting on cord 13c, listening through speaker 9e, through transceiver means (not shown) located substantially within electronics enclosure 2c, and radiatively to service provider, including other telecommunications services, through antenna 14i. Alternatively, after executably selecting appropriate display-based settings (not shown) digital copying camera 9f peripheral device, located within handset 9a, may be used in place of a document scanner for digitally copying documents or recording scenes by framing subject matter appropriately in view of display 4b and pressing button 9h to record the viewed scene through lense 9g.

Because lense diameters of digital camera units are of the order of a quarter of an inch, hyperfocal distances are significant and, therefore, a general-purpose camera can have a fixed-position lense. A subset of recorded, i.e., captured image, subject's graphical information (not shown) can be displayed on the display in order to reduce bandwidth requirements and, therefore, time required to begin recording a subject. Handset 9a, when appropriately deployed and configured by display-based settings (not shown) includes UPC bar-code reader 9i peripheral device for reading and deciphering bar-code labels on street signs to determine map coordinates and names of intersecting streets should situation information service be unavailable, for example, or information about products, and storage container contents. Information derived from copied documents, digitized scenes, or deciphered bar codes, can be communicated to other users on other systems, networks, or communication modes through the service provider. Handset 9a may alternately be constructed to communicate wirelessly with device 2b as with device 2e shown in FIG. 10.

Figure 5:
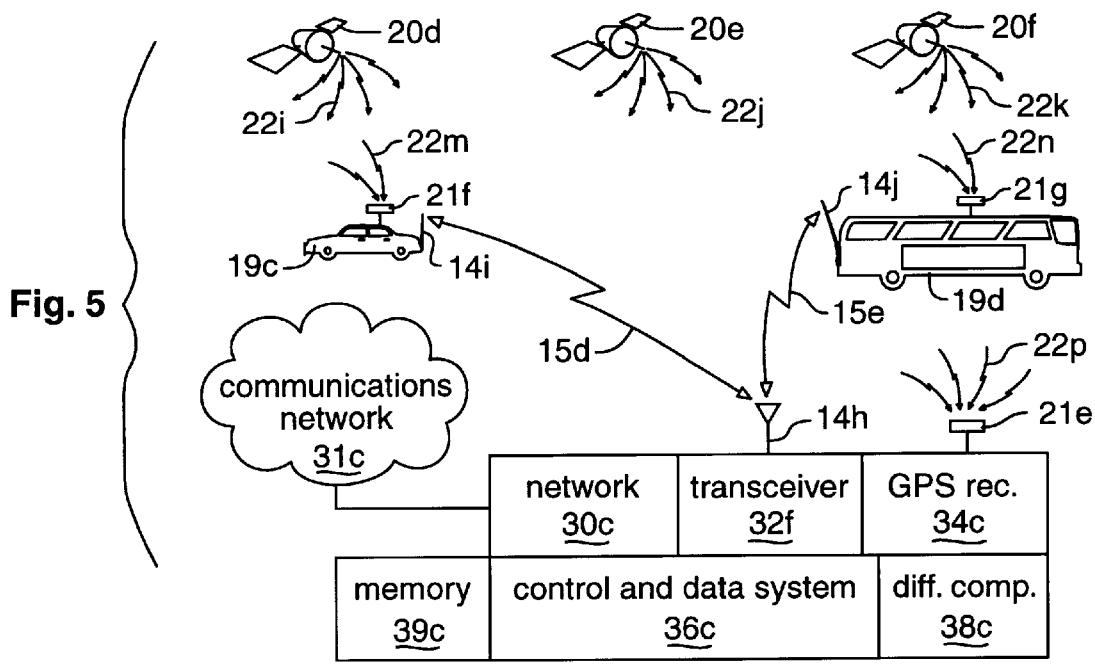
FIG. 5 is a diagram of the main components of a situation information system for comparatively regional, open environments.
Figure 6:
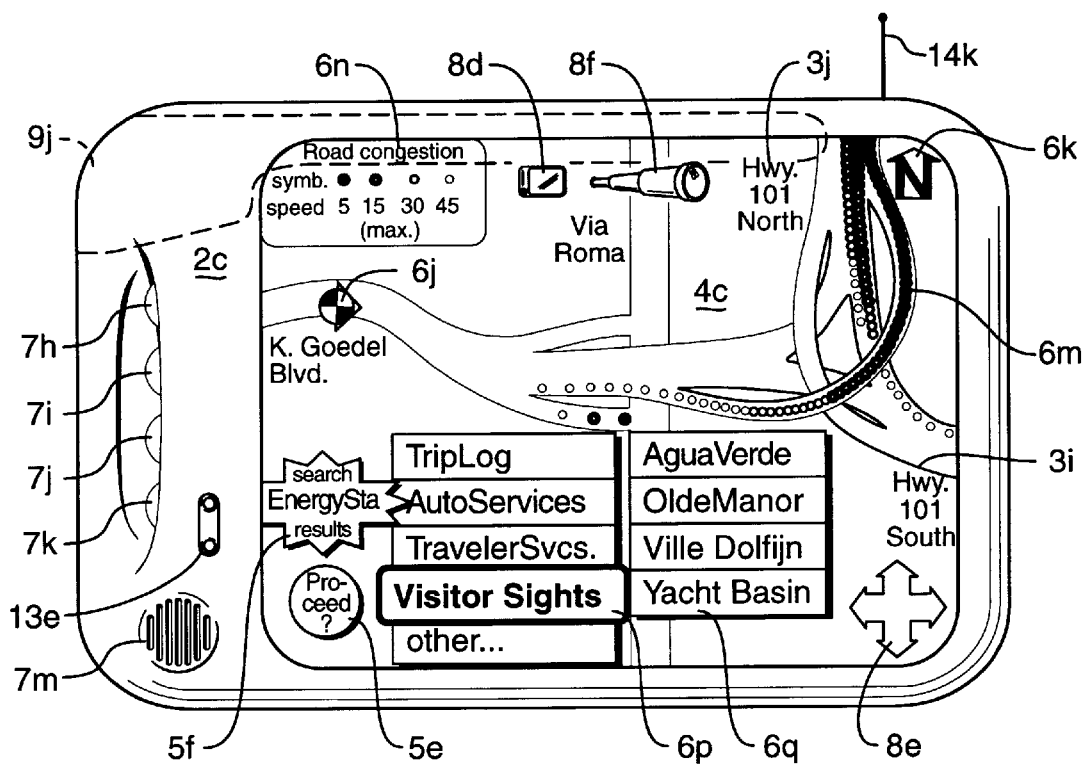
FIG. 6 is a diagram of a situation information device with graphical display showing a exemplary metropolitan area plan and other graphical situation information elements.

Description of situation information system preferred embodiment in FIGS. 5 and 6:

Referring now to FIG. 5 which shows a situation information system for use in comparatively open environments which includes transceiver 32f which generally transmits and receives information to and from mobile situation devices located in vehicles 19c and 19d by way of rf antenna 14h. Transceiver 32f, by way of its antenna, is shown transmitting and receiving information 15d and 15e to and from the mobile devices (not shown) represented as being located within vehicles 19c and 19d, respectively, by means of antennas 14i and 14j, respectively, in the manner shown in FIGS. 7 and 8, below. Transceiver 32f connects to control and data system 36c, which, in turn, connects to differential computer 38c and memory 39c and to other systems including global communications network 31c by way of computer network 30c. Control and data system 36c receives GPS signals from satellites 20d, 20e, and 20f by way of satellite information transmissions 22i, 22j, and 22k, respectively, information reception 22p, GPS antenna 21e, and GPS receiver 34c. The mobile devices located in vehicles receive GPS signals from the satellites via satellite information transmissions 22i, 22j, and 22k and information reception 22m and 22n, respectively, and GPS receivers 21f and 21g, respectively, as further shown in FIG. 8.

The service provider includes transceiver 32f, antenna 14h, GPS receiver 34c, GPS antenna 21e, control system 36c, network 30c, differential computer 38c, memory 39c, and communications network 31c. The radio locating instrument signaling function for vehicle mobile device 19c is provided by satellites 20d, 20e, and 20f, satellite information transmission 22i, 22j, and 22k, respectively, satellite information reception 22m and 22p, satellite antennas 21e and 21f, GPS receiver 34c, antennas 14i and 14h, information 15d, transceiver 32f, and control system 36c. The radio locating instrument signaling function for vehicle mobile device 19d is provided by satellites 20d, 20e, and 20f, satellite information transmission 22i, 22j, and 22k, respectively, satellite information reception 22n and 22p, satellite antennas 21e and 21g, GPS receiver 34c, antennas 14j and 14h, information 15e, transceiver 32f, and control system 36c.

FIG. 6 shows a preferred embodiment situation information device 2c which is a handheld computing and wireless communications appliance with control programs (not shown) of the situation information system such as that shown in FIG. 5. Device 2c includes a touch-screen graphical display unit 4c, device controls 7h, 7i, 7j, and 7k, speaker 7m, IR transceiver 13e for data communication with other devices, and rf antenna 14k. The graphical display unit, display 4c, shows information including regional highways 3i, highway information 3j, visit list program control icon 5e and service provider search hit icon 5f, device location and direction symbol 6j, north direction symbol 6k, traffic congestion indication 6m, traffic congestion legend 6n, device control icon 8d, display scroll icon 8e, look-ahead icon 8f, proximate information menu 6p, and proximate information submenu 6q, which latter two menus and device location and direction symbol 6j may be mappable hypertext items as described below in FIG. 12.

Operation of the situation information system preferred embodiment shown in FIGS. 5 and 6:

Referring to FIG. 5 in which vehicle-located mobile situation information devices 19c and 19d of subject invention can be seen providing situation information, in the form of mobility-related information about each of the devices as well as information and services requests, by way of antennas 14i and 14j, respectively, and information 15d and 15e, respectively to the situation information service provider by way of antenna 14h, and the devices themselves receiving situation information from the provider, in the form of processed traffic data, other proximate situation information, and other services. The approximate locations of the devices are derived from timing signals received from the GPS satellite constellation, i.e., those satellites available for providing positioning information, of GPS satellites 20d, 20e, and 20f by way of satellite transmitted information 22i, 22j, and 22k, respectively, to devices 19c and 19d by way of satellite received information 22m and 22n, respectively, and GPS antennas 21f and 21g, respectively. As the devices' users log on to the situation information service provider by broadcasting users' identification codes and, optionally, global coordinates, the service provider responds with each user's channel assignment, which channel may be a specific rf, a digital-code channel, or another communications channel selection scheme. Note that the service provider receives GPS information 22p from the GPS satellite constellation to GPS receiver 34c by way of GPS antenna 21e, and the information is processed by differential computer 38c to derive the corrections necessary to produce mappably accurate global position or coordinates of the mobile device's GPS antenna and those of other users substantially throughout the service provider's service area. At an early point in a communication session the service provider may also respond to each user with GPS corrections specific to each satellite currently in use by the situation information system and the users such that the devices compute differentially corrected global positions.

Alternatively, given sufficient information communication and processing bandwidth, the service provider may compute each user's corrected position coordinates and transmit each user's coordinates back to the appropriate user. Users' positions may be broadcast to all pertinent users such as shown in FIG. 11 and its associated description. The service provider receives and transmits the information with transceiver 32f by way of the antenna 14h, computes corrected global position, correlates actual position and velocity data collected individually from users' periodic transmissions in control and data system 36c, interpolating as appropriate to provide graphically integral information from sparse data sets, and transmits the corrected position data individually and correlated position and velocity data to all users, providing the users with coherent, timely information. The service provider updates information about the location of the devices in service provider memory 39c, which is then correlated with proximate information to be transmitted and modified by user-provided filters and options shown in FIG. 14, below. Additionally, the service provider responds to the users' requests for services including proximate situation information, communications services to other of the aforementioned devices, services to other networks 30c, and services to communications network 31c for remote access to other systems, for example.

Information device 2c in FIG. 6, being located within a vehicle with connection to external antennas, as shown in FIGS. 7 and 8, is assumed to having been connected to or logged on to the service provider's system and the device's position being known by the situation information system of FIG. 5, i.e., residing in memory 39c, operates by receiving information by way of antenna 14k, conveying the information to the user with display 4c and speaker 7m, the characteristics of which can be changed by the user through device controls 7h through 7k. As the user's location, shown on the display by device location and direction symbol 6j as being in the eastbound lane of K. Goedel Blvd., approaches within a selectable distance of the proximate interchange, proximate information menu 6p appears on the display or alternatively may be executably selected to appear by the user as shown in FIGS. 11 and 12, including proximate submenu 6q to provide user with information pertinent to the attractions located near the relatively approaching highway interchange. Traffic congestion indication 6m, is interpreted by means of traffic congestion legend 6n and which may be interpolated from a sparse data set, may induce user to alter travel direction or telephone his or her delay by way of telephone handset 9j. User may also orient himself or herself globally by north direction arrow 6k, within the interchange area by referring to map details such as highway outlines 3i and highway name 3j.

Additionally, user may change or scroll the portion of area plan in view on the display by executably selecting the appropriate arrow of display scroll icon 8e to move the viewing window in that direction. User may optionally access other device functions, e.g., e-mail, by executably selecting device control icon 8d, conduct a search of current service provider information, in this example "EnergySta(tions)" and which results appear on the display by service provider search hit icon 5f which is shown positioned adjacent to menu item "AutoServices" which serves to implement retrieval of the desired information, or enter information through unattached peripheral devices (not shown) such as keyboards which may communicate with the device via IR transceiver 13e. User may optionally download other information from a prepared list of sources (see FIG. 13) while viewing the information currently shown on the display and view the aforementioned other information by pressing visit list control icon 5e. Look ahead icon 8f selectably provides information for areas beyond user's current area as described in FIGS. 11 and 12 and below.

Description and operation of situation information system preferred embodiment in FIGS. 7 and 8:

FIG. 7 shows a situation information device 2d inserted in insertion direction 41a into interface bracket 40, which includes tilt-adjustment hinge 40a and, at the rear of the bracket are external power supply cable 42a, local network circuit 42b, external input cable 42c, external GPS antenna circuit 42d, and external rf antenna circuit 42e. For advantageous viewing bracket 40 may be optionally rotated on the axes represented by tilt arrow 41b and swivel arrow 41c.

Referring now to FIG. 8 which shows a diagram of device 2d in the process of being inserted into and connected to bracket 40, shown by insertion arrow 41d, for the purpose of connecting to off-device resources including power supply cable 42a, network circuit 42b, input cable 42c, GPS antenna circuit 42d, and rf antenna circuit 42e by way of bracket connector pins 44a through 44e, respectively, substantially contained in interface bracket 40. Upon insertion of the device into the bracket, bracket pins 44a through 44e respectively connect to corresponding pin receptacles 45a through 45e, which are connected to power supply switch circuit 43a, network interface 43b, input interface 43c, GPS antenna switch circuit 43d, rf antenna switch circuit 43e, respectively, integral with the device. The GPS antenna circuit receives external GPS information 22r by way of GPS antenna 21h which directs the information signal through structure 25a; similarly, the rf antenna circuit receives external rf information 15k by way of rf antenna 14j which, by way of its associated circuitry, directs the information signal through interposing structure 25a.

The aforementioned circuits and interfaces include electronics components and configurations appropriate to the impedance balancing, powering, and information exchange between device 2d and the external systems or off-device resources, including interconnection when one or more of the device circuits and off-device resources are energized and operating, commonly referred to as hot plugging. Structure 25a includes building and vehicle structures. Network circuit 42b includes, for example, the Secure Personal Applications Network, U.S. patent application Ser. No. 08/613,725 Hollenberg. Device 2d may be removed from the bracket for hand-held use, for example, pedestrian use, by pulling the device in a direction relatively outwardly, in the reverse direction to that indicated by arrow 41d, and device 2d modifies its configuration to use internal or device resources only. The performance of the situation information device is increased and extended by connecting it to off-device resources or external systems. For example, device 2d may be inserted into bracket 40 mounted in a vehicle for greater operative mobility and used for networking with vehicular systems. Alternatively, bracket 40 may be mounted in a retail store location to which device 2d may be attached for composing e-mail using a keyboard supplied for customer use by the store. Yet other alternatives include a keyboard which may be stored within the device that slides out for use (not shown) or a separate keyboard that communicates by a photonic, including IR, link.

Figure 9:
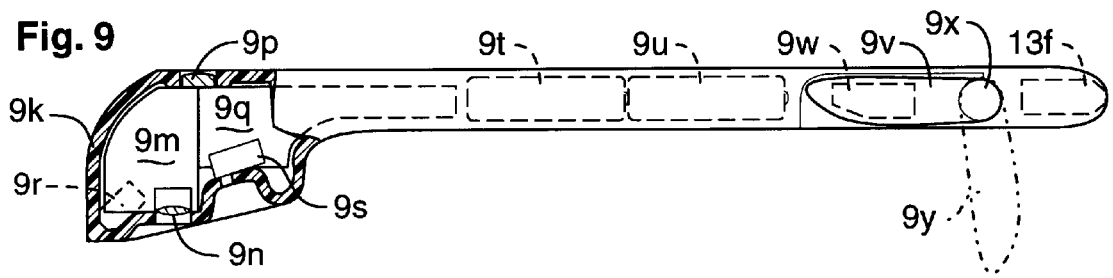
FIG. 9 is a diagram of an exemplary embodiment of a telecommunications handset, including photonic link to its separate host device, which includes additional peripheral devices.

Description and operation of situation information system alternative embodiment in FIGS. 9 and 10:

FIG. 9 shows wireless telephone handset 9k which includes peripheral devices including digital copying camera 9m, camera lense 9n, camera record button 9p, digital/analog conversion and memory circuitry 9q, bar-code reader 9r, handset speaker 9s, energy storage 9t and 9u, deployable mouthpiece 9v, handset microphone 9w, mouthpiece hinge 9x, mouthpiece deployed position 9y, and IR transceiver 13f.

FIG. 10 shows handset 9k in use as a telephone handset by user 19f in which digitized voice data is communicated to and from situation information device 2e, which includes handset storage space 2f, by bidirectional information communication 13g, which is received by device 2e through an IR transceiver (not shown) similar to that of IR transceiver 13c in FIG. 6. Device 2e includes rf transceiver (not shown)

which transmits information 15m by way of radiative antenna 14k which is appropriately positioned away from the user's head area in order to reduce the rf radiation dose absorbed in the user's vital organs, particularly the brain. This reduction of rf radiation occurs according to the inverse-square law in which the radiation at a given distance from the original distance varies inversely proportionally to the square of the factor of change in distance. Thus, by doubling the separating distance, radiation received decreases to one-fourth the original; by ten times the separation, the radiation diminishes to one-hundredth of the original. Additionally, certain CMOS microchips, such as those potentially used for gathering light in digital cameras, are susceptible to EMWR interference.

By way of explanation of FIG. 10, as the user deploys the handset for use from storage space 2f in the device, handset mouthpiece 9v deploys by rotating about hinge 9x of FIG. 9 through the urging of a spring (not shown), and the device provides the telephony function when the user selects the appropriate menu function set (not shown) on the display of the device. The transceiver and the radiative antenna are naturally positioned away from the user who may view data displayed (not shown) by the device during a telephony function. Alternatively, user may generate situation information by copying documents or recording scenes using the copying camera or bar-code reader peripheral devices to generate information reader for communication to the device via the IR link.

Description and operation of situation information system device display and mappable hypertext code sequence in FIGS. 11 and 12:

FIG. 11 shows a portion of device 2g with display 4d which displays exemplary map data of locations in advance of the mobile user's current location and is called a look ahead session. The graphically displayed map data, which may consist of mappable hypertext code sequences such as that shown in FIG. 12, includes element road 3k, elements Deneba 3m and Pietown 3n which represent towns, element mountain 3p, and element Airport 3q. Shown also are visit list control icon 5g, device location and direction symbol 6r, other device symbol 6s which is a symbol representing the location of another similar device whose user has selected that the symbol be displayed along with other device information 6t which shows that other user's name, vehicle description as a green Toyota, and an executable option to contact the other user by e-mail or through other optional communications methods. Continuing with FIG. 11 and the contents of display 4d are look ahead information menu 6u, look ahead list 6v, mileage tabulation 6w, estimated transit time 6x, north direction symbol 6y, device control icon 8g, display scroll icon 8h, and look ahead icon 8i. FIG. 12 shows mappable hypertext code 29 consisting of element item reference 29a, identifier 29b, location 29c, and data type 29d.

A computer memory organized to include mappable hypertext code sequence 29 in FIG. 12 provides for rapid display of mappable information items, including map features, information sources, names, menus, and lists, certain of which may be executably selected by a user in order to display additional information related to any of such items, called a hypertext element, by receiving new information transmitted from the service provider. Additionally, code 29 provides for graphically displaying on the user's display symbols and text appropriately relating to the items and in a manner which shows each item in a measurably appropriate relation to other such items of geographical features shown on the display in an information sequence of data elements. Element item reference 29a is a code which determines the ordering of a particular element in a display of a table of similar such items or within a database of such information.

For example, should code 29 refer to a merchant desiring out-of-order placement of the merchant's information in an ordered display of similar information, item reference 29a would be appropriately changed to automatically provide the out-of-order placement on a user's display of such information. Element identifier 29b provides the mapped item's name and, if applicable, the location or address, which may be a URL, of its additional information. Element location 29c provides the item's geographical location, in longitude and latitude or in reference to a given feature which the element location provides. Element data type 29d provides information as to whether the item's symbol, icon, or name is capable of being included with other items in a executably selectable menu which appears to pop up, that is, to quickly graphically appear adjacent to the icon or text item which was executably selected by the user, on the user's computer display, whether it is to be included in the map displayed on user's computer, and, if displayed, whether the item's symbol, which may be a standard display symbol which is resident in memory, including storage, on user's device, or the item name can be subsequently selected by a user to automatically provide additional information about the item, such as by enlarging the detail, called zooming in, or, for example, as hypertext, in which the item name or symbol can be selected or clicked on by a user to provide additional information. Data type 29d also includes executable code for animated icons or avatars (graphic elements which represent their users in such a display). Concise code such as mappable code 29 is particularly suited to low bandwidth information communication systems such as those which might be found in large areas.

After connection with the local information service provider, the user's location and look ahead request, initiated by selecting look ahead icon 8f in FIG. 6, are communicated to the service provider which responds by sending the appropriate information. Device 2g receives mappable hypertext code for each item to be represented on the display, such as items 3m, 3n, 3p, 3q, and main roads. Items having standard display symbols resident in the device's memory, including storage, are called by the display program and displayed to expedite the display process by obviating transmission of that data. A linear element such as a road may be transmitted as a bit map or as multiple mappable hypertext codes to usefully display its changes in direction or as a single code with multiple location elements to indicate the start and stop location of each segment and features such as curves, intersections, etc. All the aforementioned items are displayed according to their geographic locations in the scale of the area to be viewed on the display, which area to be viewed is selectable and may be zoomed in or out, for example, along with user's location symbol 6r.

Other user symbol 6s provides a method to communicate with other device users, and use of such a symbol is optional to the user owning the symbol, as is the amount of information provided with the symbol which is executably selectable, as shown by other device information table 6t. Information which may be executably selected by user in order to receive additional information is arranged as executably selectable menus or hypertext items under look ahead icon 8i, including look ahead menu 6u and look ahead list 6v. Separations between displayed features such as user's location 6r, elements Pietown 3n and Deneba 3m, which are towns connected by exemplary highway 22, as well as to other listed towns, are calculated using distances derived from latitude and longitude, which have been appropriately converted to distance relationships, i.e., correcting local longitude for the local latitude prior to determining the map distance, and provided to the user as mileage tabulation 6w and estimated transit time 6x to other exemplary cities. Portions of the map lying outside the displayed area may be scrolled into view using scroll icon 8h.

Figure 13:
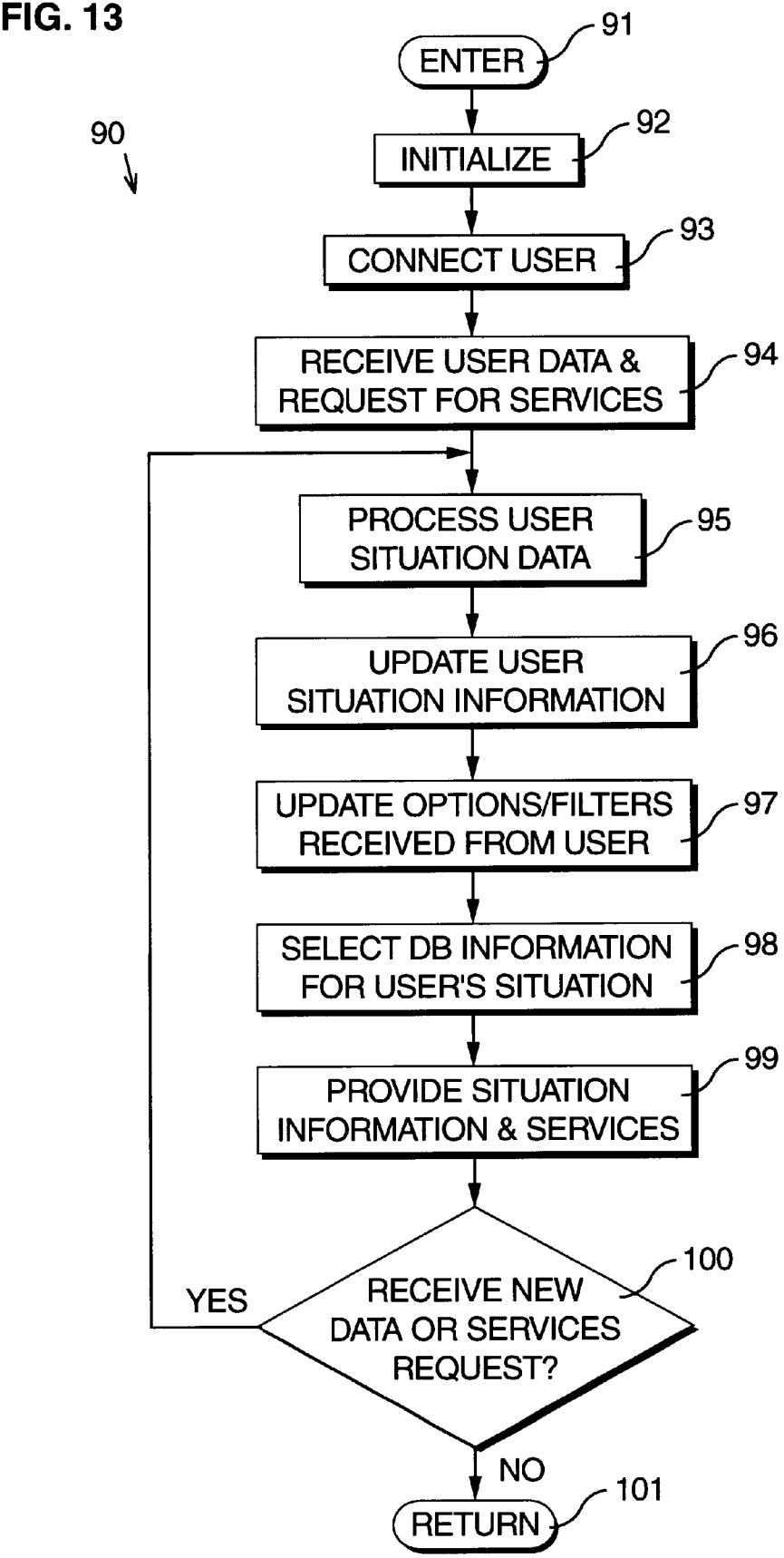
FIG. 13 is a flow diagram of the main components of the service provider computer control program of the preferred embodiment of a situation information system.
Figure 14:
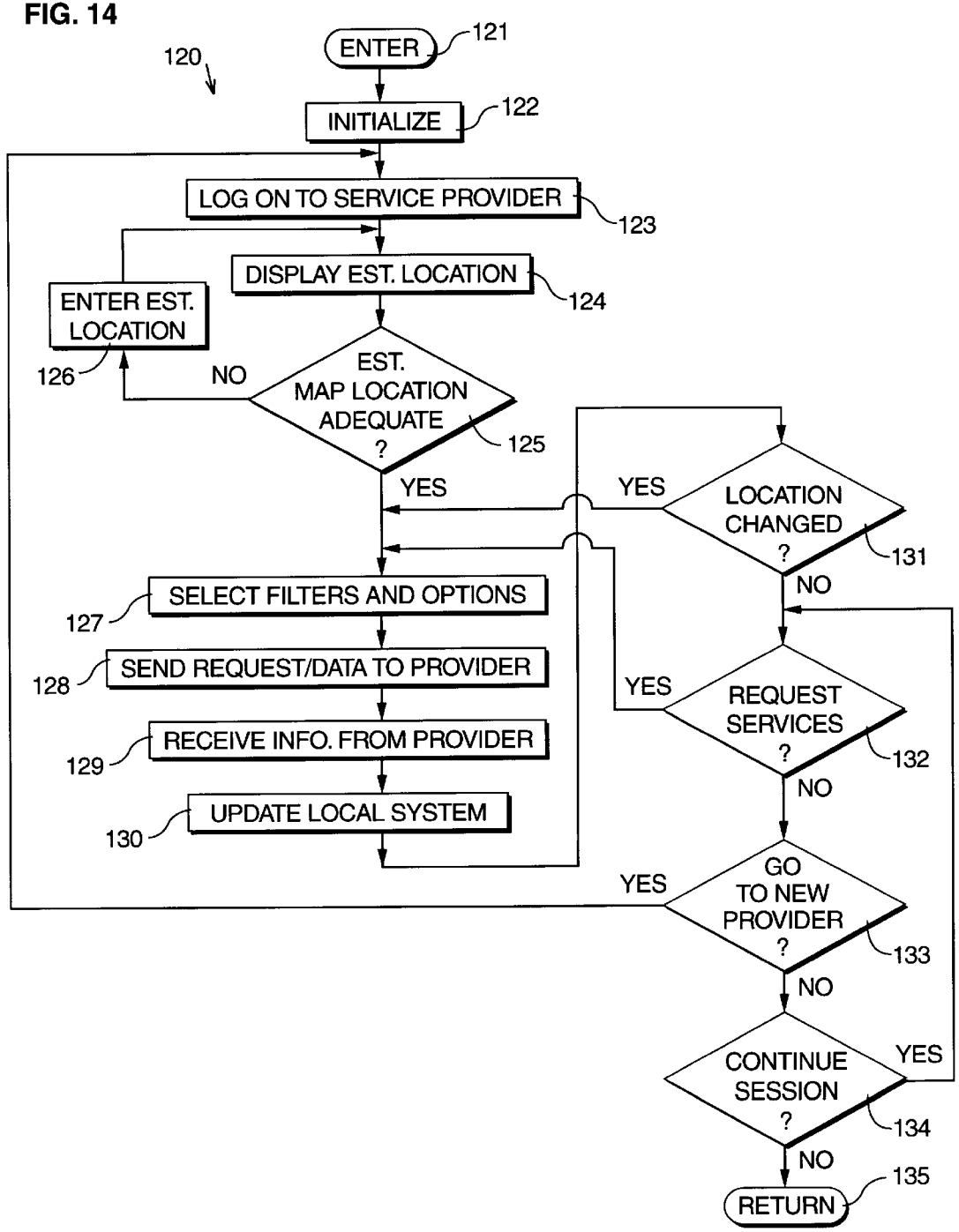
FIG. 14 is a flow diagram of the main components of the user computer control program of the preferred embodiment of a situation information system.

Description and operation of situation information system service provider computer control program and user computer control program in FIGS. 13 and 14:

FIG. 13 shows a flowchart, with element numbers within brackets, of SERVICE PROVIDER COMPUTER CONTROL PROGRAM <90>, generally consisting of computer controlling instructions and evaluations, by which subject invention, particularly, for example, control and data system 36c, processes users' communicated data and requests for information and services. After situation information service provider system loads the program at instruction ENTER <91>, the program collects stored operating parameters and data at INITIALIZE <92> and is then operationally able to provide sessions of user services. A typical user logs on at CONNECT USER <93> and the system determines user's validity by comparing user identification (ID) and password with memory-stored copies, assigns user a communications channel or channels through which further interactions are conducted, and receives user device location data at RECEIVE USER DATA & REQUEST FOR SERVICES <94>. The user data is processed to determine actual user device location and, optionally from receipt of subsequent location updates, velocity at PROCESS USER SITUATION DATA <95>. User location data is correlated with data from other users to provide near real time, vehicular traffic-pattern situation information for transmission to other users' devices for graphical display or, in the case of pedestrian traffic, for analysis in marketing studies or other use studies.

At UPDATE USER SITUATION INFORMATION <96> user's device location is transmitted to user's device for display accompanied with, for example and if appropriate to user's situation, graphical vehicular traffic pattern information. User information filters, which selectably limit and define the types of information the user suitably requires, and options include, prearranged communications services required by user on a regular basis, such as remote access to other computer networks, news services, including market data, etc., are received by the service provider which then updates them appropriately in UPDATE OPTIONS/ FILTERS RECEIVED FROM USER <97>. Based upon user filters, options and location, the service provider selects appropriate information from the system database (DB) specific to user situation in SELECT DB INFORMATION FOR USER'S SITUATION <98>, and this information is transmitted to the user in PROVIDE SITUATION INFORMATION & SERVICES <99>. If the service provider receives new data or a services request from the user, that is, if evaluation RECEIVE NEW DATA OR SERVICES REQUEST? <100> evaluates to YES, the processing of program <90> loops back to instruction PROCESS USER SITUATION DATA <95>. However, should the user not send new data or request services such that evaluation RECEIVE NEW DATA OR SERVICES REQUEST? <100> evaluates to NO, the service session ends at RETURN <101>.

FIG. 14 shows a flowchart, with element numbers within brackets, of USER'S COMPUTER CONTROL PROGRAM <120>, generally consisting of instructions and evaluations, by which subject invention, particularly, for example, situation information device 2c, requests information and services and subsequently processes the information communicated from the service provider. After situation information device 2c loads the program at instruction ENTER <121>, the program causes the device to collect stored operating parameters and data from memory at INITIALIZE <122> and is then operationally able to begin a session. As user selects service provider and logs on at LOG ON TO SERVICE PROVIDER <123>, the device transmits user's ID and password, switches to assigned communications channel or channels through which further interactions are conducted. At DISPLAY EST. LOCATION <124>, user's position as of the last operation of user's device will show on user's display. At evaluation EST. MAP LOCATION ADEQUATE? <125>, user checks the display and, should the displayed position appear obviously incorrect, user may select NO and, at the prompt ENTER EST. LOCATION <126>, update the position manually. Should evaluation <126> evaluate to YES, processing continues to instruction SELECT FILTERS AND OPTIONS <127> in which user may selectably define the type of information required from the service provider and options required, such as remote access to a company computer network, e-mail, or display of location of selected alternate situation information devices such as a transponder carried by a child, advertising messages, etc. All such selections and information requests are sent, along with periodic location information reports or data, to the service provider at SEND REQUEST/DATA TO PROVIDER <128>.

Situation information from the service provider, including map-referenced information, advertisers' and merchants' messages, weather, news, including traffic congestion graphical data and accident reports, if appropriate to user's situation, filters, etc., are received at RECEIVE INFO. FROM PROVIDER <129>, at which point device 2c will update its data at UPDATE LOCAL SYSTEM <130>. Program <120>next proceeds through a series of evaluations of user's actions including whether user's location has changed at LOCATION CHANGED? <131>, which, if evaluating to YES, corresponds, for example, to the equivalent of the user having generated additional data and processing loops back to SELECT FILTERS AND OPTIONS <127>, and, if the filters and options remain unchanged, continues to send data in aforementioned instruction <128>. However, should user's location remain unchanged within the limits set by service provider according to computational bandwidth constraints, for example, or through the user's selection, and evaluation <131> evaluate to NO, program <120> next evaluates whether or not the user's device has recorded a new request for services, including information requests, at REQUEST SERVICES? <132> in which a YES evaluation causes processing to loop back to instruction <127>. Next, should no services or information be requested and evaluation <132> evaluate to NO, opportunity to change providers is offered with evaluation GO TO NEW PROVIDER? <133>, which, should user elect YES, causes the program to loop back to LOG ON TO SERVICE PROVIDER <123>. Should evaluation <133> evaluate to NO, user is queried as to whether or not the current session should be continued at evaluation CONTINUE SESSION? <134>, which, if evaluating to YES, causes processing to loop back to REQUEST SERVICES? <132>. Finally, should evaluation <134> evaluate to NO, program <120> may be terminated at RETURN <135>.

Figure 15:
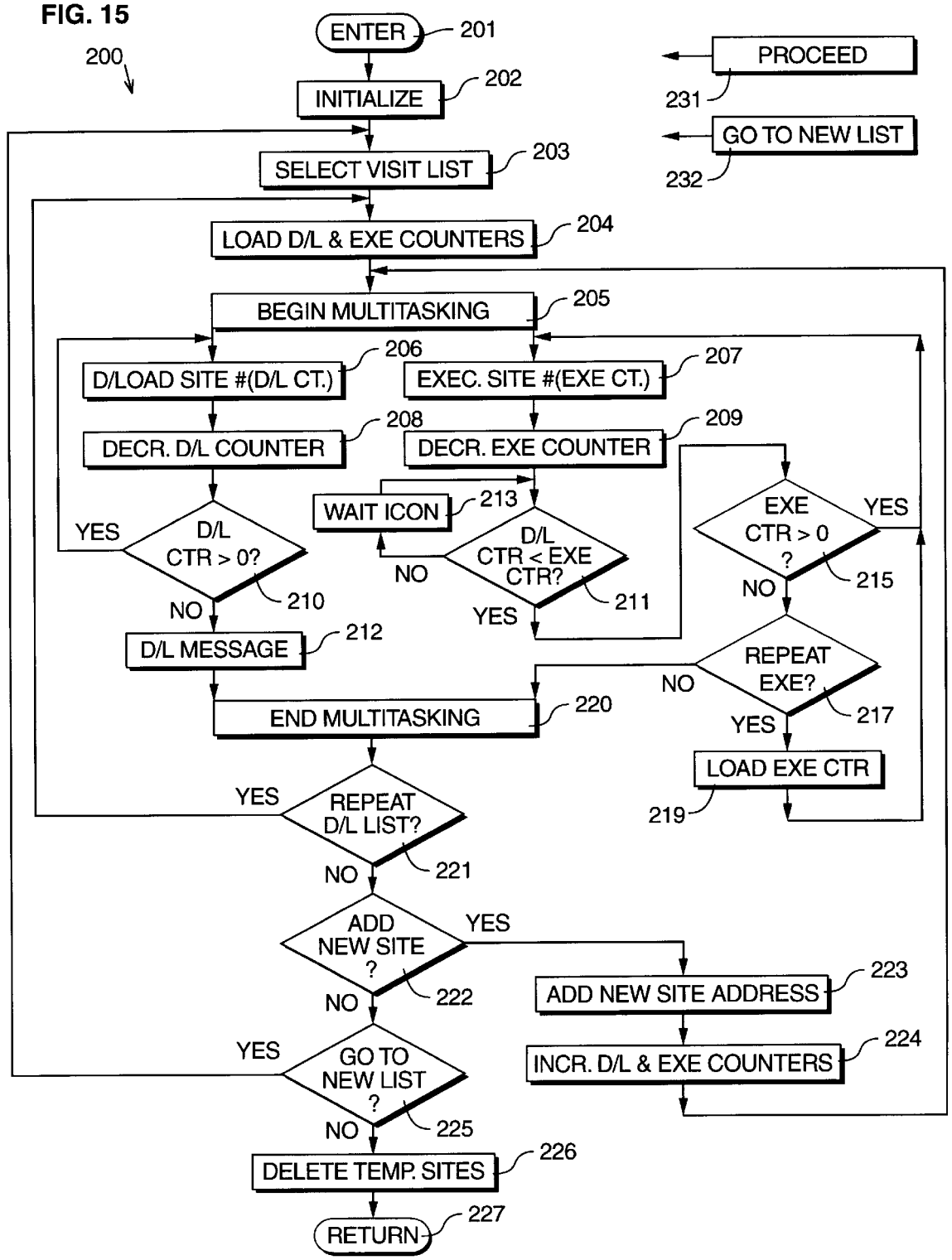
FIG. 15 is a flow diagram of the main components of the visit list computer control program of the preferred embodiment of a situation information system.

Description and operation of situation information system visit list computer control program in FIG. 15:

FIG. 15 shows a flowchart, with element numerals within brackets, of VISIT LIST COMPUTER CONTROL PRO- GRAM <200>which downloads sites from a list of information sites to devices such as device 2c during the time the user views, otherwise uses, or executes information obtained from sites downloaded earlier, including from other sources. The program generally consists of instructions and evaluations, by which subject invention, particularly, for example, situation information device 2c and visit list control icon 5e of FIG. 6, may be optionally employed by user to select among serially downloaded information providing sites. After the situation information device loads the program at instruction ENTER <201>, the program collects stored operating parameters and data at INITIALIZE <202> and is then operationally ready to begin the session. As user selects which of an optional plurality of visit lists to begin downloading, depending upon a commuting, vehicle-bound user's direction of travel or time of day or a stationary user's accustomed perusal of financial information, as examples, at instruction SELECT VISIT LIST <203>, a menu of available lists are caused to appear on device display 4c of FIG. 6 and a first visit list (not shown) is selected to take priority. The visit lists consist of a given number of information-providing sites on one or more networks of sites, to each of which is serially assigned a first number (not shown), which may be a pointer or reference to other appropriate locations in memory, for the purpose of numerically ordering the first list's sites' downloading, a download number, and a second number (not shown) for the purpose of ordering the first list's sites' execution, called an execute number, that is, making use of a given site's downloaded information by displaying, executing or processing the site's code, or otherwise making use of its information.

Further, download and execute numbers are each loaded into computer memory, such as a stack, an array, or a register (not shown), as examples. The first number is variously referred to herein as "download counter", "D/L CTR", or "D/L CT.", and the second number variously referred to herein as "Exe counter", "EXE CTR, or "EXE CT.", depending upon the drawing space appropriately available. After the visit list is selected, subject program <200> loads the first visit list's number of sites as first and second numbers in the download and execute counters, respectively, in LOAD D/L & EXE COUNTERS <204>. The visit list program, in order to accomplish its two primary tasks in apparent concomitance of the viewing or executing portion to the downloading portion, the latter taking precedence or priority because of the time-dependent nature of such downloading, requires the effect of simultaneous computer processing, such as multitasking or multiple program threads, or actual multiple processing by multiple processors. The program utilizes, for example, multitasking which is well understood in the computer industry and entails the switching from one task to the other, usually governed by a priority scheme, by a single processor by way of its control program or operating system. The multitasking begins with instruction BEGIN MULTITASKING <205> which allocates and arranges memory to receive each task's parameters as the computer switches from the site downloading task to the site execution task and back again, as necessary until tasks are completed. In operation, portions of the downloading site information may be stored in a buffer and subsequently moved to memory, including storage.

The site downloading task begins with the first site in the visit list, denoted by the first site's assigned serial downloading counter number occupying proximal position in memory, in D/LOAD SITE #(D/L CT.) <206>, where "(D/L CT.)" is the proximate number in the download counter and refers to the next visit list site address. Should a site not download in a timely fashion, program <200> provides a message to alert the user to the delay and to which the user may respond by selecting PROCEED 231. With downloading of site information completed, the download counter is decremented, i.e., reduced by one, in DECR. D/L COUNTER <208> and the download counter content is evaluated in D/L CTR>0? <210>. Should there be additional sites in the visit list to download, evaluation <210> evaluates to YES and processing loops back to download the next site in D/LOAD SITE #(D/L CT.) <206>. If any site cannot be reached or its downloading halts, D/L MESSAGE 212 provides that site's name. Should downloading be successful for all sites of the list which are capable of being located and downloaded, evaluation <210> evaluates to NO and a message is presented to the user that list downloading is completed in D/L MESSAGE <212> and processing proceeds to terminate multitasking at END MULTITASKING <220>.

The execution task begins at EXEC. SITE #(EXE CT.) <207> in which the site corresponding to the proximate site address in the execute counter and, initially, may be the site currently being downloaded, in which case the downloading task, specifically, the rate of the downloading, will take precedence over the execution task. After a given site is executed by, for example, being displayed on the device's display, the execute counter is decremented in DECR. EXE COUNTER <209> and processing proceeds to determine whether or not site downloading is advancing ahead of site execution by comparing the counters in evaluation D/L CTR<EXE CTR? <211>. Should the download counter equal the execute counter, that is, the same site being downloaded is being executed, evaluation <211> evaluates to NO and a "wait" message is presented to user, by way of the display or other means, in WAIT ICON <213> and processing returns to evaluation <211>. Should downloading be advanced in relation to execution and evaluation <211> evaluates to YES, processing proceeds to determine whether or not sites remain to be executed in EXE CTR>0? <215>, which causes, should there be more sites to execute and evaluation <215> evaluates to YES, processing to loop back to execute the next site in EXEC. SITE #(EXE CT.) <207>. If, to the contrary, evaluation <215> evaluates to NO, processing proceeds to query the user as to whether or not to repeat the current visit list execution in evaluation REPEAT EXE? <217>. Should execution repetition be selected and evaluation <217> evaluate to YES, the execution counter is reloaded at LOAD EXE CTR <219> and processing loops back to the beginning of the execution task at instruction <207>. If evaluation <217> evaluates to NO, multitasking terminates at END MULTITASKING <220>, similar in manner to the downloading task.

Processing continues at evaluation REPEAT D/L LIST <221> which repeats the downloading and execution of the same list sites in the event the user requires more current information from the aforementioned sites, which, if selected, causes processing to loop back to instruction LOAD D/L & EXE COUNTERS <204>. Should this evaluation evaluate to NO, the evaluation ADD NEW SITE? <222> is processed next and, evaluating to YES, processing continues to ADD NEW SITE ADDRESS <223>, in which one or more new site addresses are added, and thence to increment the download counter and the execute counter at INCR. D/L & EXE COUNTERS <224> appropriately before looping back to download and execute the added sites. Should evaluation <222> evaluate to NO, processing continues to evaluate whether or not the user wished to change to a new visit list at GO TO NEW LIST? <225> which, if evaluating to YES, processing loops back to select a new visit list at SELECT VISIT LIST <203>. Should evaluation <225>evaluate to NO, sites located by keyword search program <300> in FIG. 14 and added as "temporary sites" to the visit list program <200> are deleted in DELETE TEMP. SITES <226> and program ends at RETURN <227>.

Additional instructions which operate globally on program <200> include PROCEED <231> and GO TO NEW LIST <232> which serve to interrupt the program at selectable locations in the course of the program's operation in order to provide for efficacious utility and, for purposes of simplifying their description, are shown in currently referred to FIG. 13 as not directly connected to the program. Interrupt instruction PROCEED <231> is optionally implemented by user actuation of icon 5e, and similarly to alternate embodiment icons 5a and 5c in FIG. 2 and FIG. 4, respectively, to cause program <200> to halt the processing of currently executing code and begin processing code referred to by the next number in the execution counter. For example, while viewing currently executing code from any given site, the code of a serially following site on the visit list is executed after PROCEED <231> is actuated and the executing code is appropriately halted. Instruction PROCEED <231> may optionally be used, as described above, for terminating the downloading of a slow-to-download site in favor of the downloading of a serially following site may proceed. The second of these global instructions, GO TO NEW LIST <232>, is actuated by user by way of a similar operation on an icon or menu item (neither of which is shown) in order to download or execute code of one or more sites on a list other than the current list.

Figure 16:
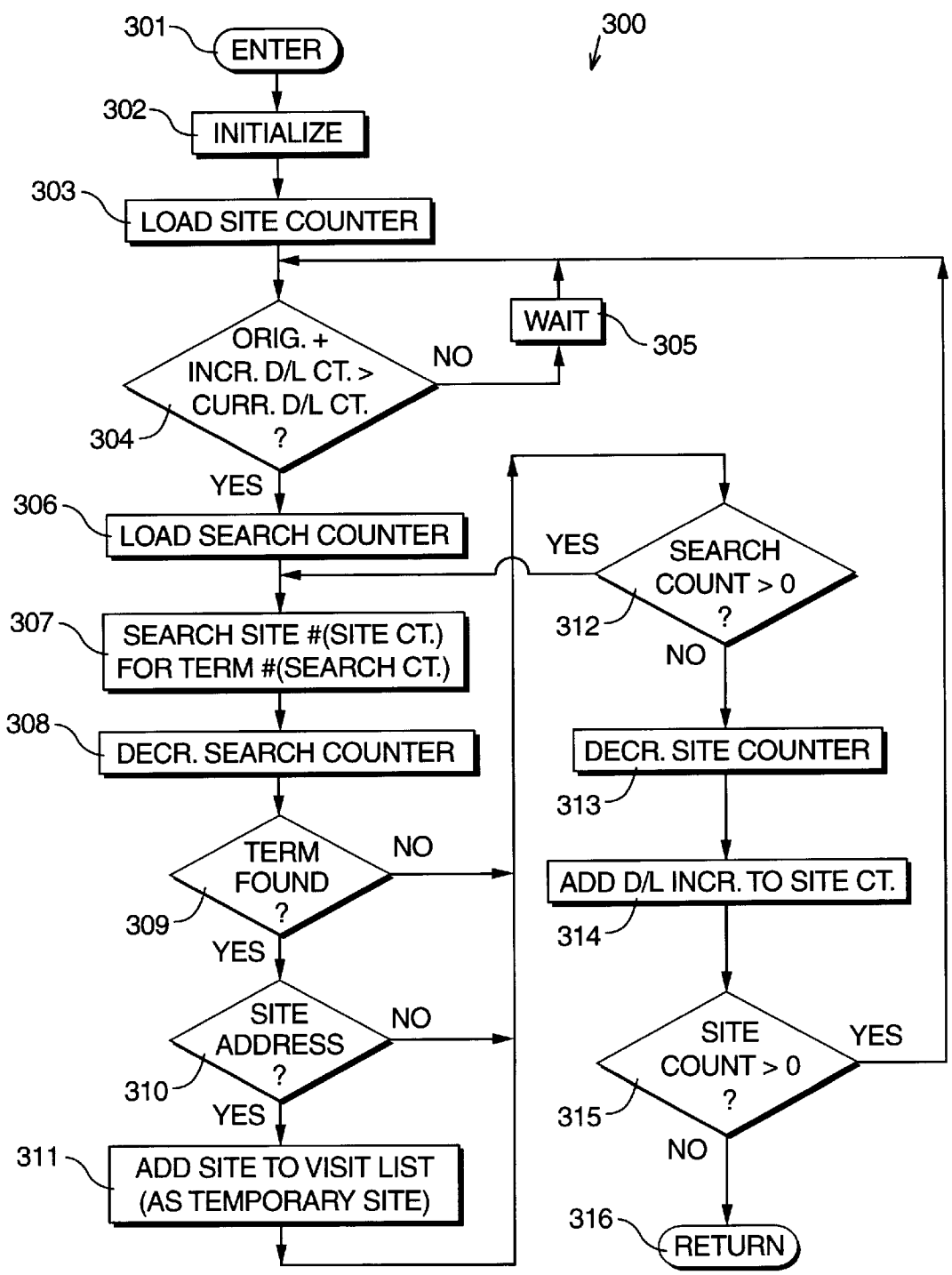
FIG. 16 is a flow diagram of the main components of the keyword-search computer control program associated with the visit list control program of the preferred embodiment of a situation information system.

Description and operation of situation information system keyword search computer control program in FIG. 16:

FIG. 16 shows a flowchart, with element numerals within brackets, of Site Keyword-term Search Computer Control Program <300> which searches information sites downloaded to devices including device 2c during the course of situation information system use including visit list program <200> in FIG. 13 and, for keyword terms found, adds the site, as a URL or address, associated with the keyword term, if available, to the visit list as a temporary site. Program <300> generally consists of instructions and evaluations, by which subject invention, particularly, for example, device 2c and visit list control icon 5e of FIG. 6, may be optionally employed by a user to select among such subsequently serially downloaded information providing sites. After device 2c loads the program at ENTER <301>, the program collects stored operating parameters and data, including data from a user-prepared list of keyword terms, at INITIALIZE <302> with which to subsequently perform a search for the keyword terms on each of the sites downloading or downloaded. LOAD SITE COUNTER <303> loads the site references, each of which may be, for example, a pointer to a memory location containing the URL or other appropriate connection path to the information source or site, from the visit list program's download counter into computer memory, such as a stack, an array, or a register (not shown), for example, and referred to herein as the site counter, and functions to maintain a record of which site is being searched.

Before proceeding, program <300> determines if at least one site has been fully downloaded by visit list program <200> and available for searching by evaluating whether or not the original download count in program <200> is greater than the current download count in program <200> in ORIG.+INCR. D/L CT.>CURR. D/L CT.? <304>. Should this evaluation evaluate to NO, processing proceeds to WAIT <305>, where it remains for a selectable period of time before looping back to evaluation <304> for re-evaluation. Should evaluation <304> evaluate to YES processing proceeds in a manner similar to instruction <303> above in which LOAD SEARCH COUNTER <306> loads keyword references into computer memory, which may be register pointers to keywords in memory, to maintain a record showing which keywords are being searched. The first search site and search keyword are selected and searched in SEARCH SITE #(SITE CT.) FOR TERM #(SEARCH CT.) <307>, where SITE CT. is the current count in the site counter and SEARCH CT. is the current count in the search counter, after which search aforementioned counter <306> is decremented in DECR. SEARCH COUNTER <308> to prepare for selection of the next search term or keyword. Should the currently searched-for term not be found, that is, TERM FOUND? <309> evaluates to NO, processing proceeds to check that at least one search term remains for searching in SEARCH COUNT>0? <312>. If the searched-for term is found in information contained in the current site, evaluation TERM FOUND? <309> evaluates to YES and determination is made in SITE ADDRESS? <310> whether or not an associated site address for the currently searched-for term can be found, which if not, evaluation <310> evaluates to NO and processing continues in SEARCH COUNT>0? <312>. Otherwise, with the associated address being found and this evaluation evaluating as YES, the site address associated with the searched-for term is added to visit list program <200> of FIG. 15 in current program <300> instruction ADD SITE TO VISIT LIST (AS TEMPORARY SITE) <311> before processing proceeds to SEARCH COUNT>0? <312>. Should terms remain to be searched in the current site information, SEARCH COUNT>0? <312> evaluates to YES and processing loops back to SEARCH SITE #(SITE CT.) FOR TERM #(SEARCH CT.) <307> to search for the next keyword search term.

Should SEARCH COUNT>0? <312> evaluate to NO, the site counter is decremented in DECR. SITE COUNTER <313> in preparation for searching the next site. In the event additional sites have been added to visit list program <200>, for example by ADD NEW SITE? <222> evaluating to YES, ADD NEW SITE ADDRESS <223> having functioned, and INCR. D/L & EXE COUNTERS <224> having incremented the download counter, all being in program <200> in FIG. 15, program <300> is similarly updated by adding duplicate increments to site counter <303> in ADD D/L INCR. TO SITE CT. <314>. The site counter is subsequently evaluated to determine whether sites remain to be searched in SITE COUNT>0? <315> following. Should evaluation <315> evaluate to YES, processing loops back to search all appropriately currently stored keyword terms in LOAD SEARCH COUNTER <306> after checking evaluation <304> to determine if at least one site has been downloaded, etc. Should evaluation <315> evaluate to NO, processing ends in RETURN <316>.

CONCLUSION, RAMIFICATIONS, AND SCOPE OF THE INVENTION

The situation information system has been described with reference to exemplary and preferred embodiments which the reader can see provide a high degree of accessible usefulness which will provide users with better, specifically timely and proximate, information. In addition, embodiments of this system will provide the richness of experience, by allowing users to participate in socially interactive settings, and capability, in conducting business and commerce in proximity to merchandise which is immediately available, not possible with the Internet's remoteness and lack of physicality. It must be remembered that the descriptions herein, including the program flow charts, are static representations of dynamic systems capable of performing entirely new functions.

While the situation information system contains many specific elements, these elements should not be construed as limiting its scope. Many other variations are possible. For example, an embodiment of the situation information system could employ various means for generating and providing location information including a mix of satellite positioning system and transponding methods using many different gating-pulse signal sources. Also, an embodiment of the situation information device could include a withdrawably stored keyboard or hinged case element with integral keyboard or a video camera could take the place of the camera in the handset or such peripheral devices could be varied in their arrangement, as examples.

Accordingly, various other substitutions, modifications, changes, and omissions may be made in the design and arrangement of the elements without departing from the spirit of the invention as expressed in the appended claims.

I claim:

1. A scalable, openly accessible, dispatcher obviating, situation information system comprising:

a. mobile computers with radios severally operated by users substantially transmitting information including location data, receiving situation information of selectable execution, including audible, visual, and tactile execution, and continually receiving telephone numbers of diverse providers of services and merchandise while obviating the resulting interference imposed by the obligatory answering of a ringing telephone as automated updates occur, and conducting shopping functions in shopping areas including stores and malls, b. radio locating means by which, from said location data including triangulation systems installed within and among buildings, the location of each of said mobile computers is determined and processed into location information including information pertaining to, and derivable from, the change in location of each of said mobile computers, and c. one or more radio sources of said situation information, including said location information, proximate information and other information, for purposes including presenting entertainment, commercial offers, and advertising whereby users of said mobile computers with radios benefit from timely information pertaining to situations within their locus.

2. The system of claim 1 wherein said situation information, substantially organized according to said shopping areas and to the power level of radio transmission, and said outgoing information, including mappable hypertext items, pop-up messages, and icons, selectably relate to the area of each of said mobile computers whereby said users of computers are selectably interactively and reciprocatively provided with descriptive information about objects, people, and events within said area of any of said mobile computers.

3. The system of claim 2 wherein said user information and said other information includes communication with others of said users of said mobile computers and said sources and information pertaining to a search of said radio sources, including commercial offers of goods and services and user identification and credit-related information pertinent to commercial agreements whereby individuals among said users of said mobile computers can locate others of said mobile computer with radios and topical events, people, products, and services and arrange for payment and fulfillment of commerce efficiently.

4. The system of claim 3 wherein said user information and said situation information include entertainment information whereby users of said mobile computers can selectably assume fictional identities for purposes of entertainment and recreational games visually, audibly, or tactilely executed selectably within the area of any of said computers.

5. The system of claim 4 wherein said mobile computers with radios include bracket interfacing means to alternatively disconnectably connect to external systems including power supplies for charging batteries of said computers and circuits in buildings and conveyances in the locus of said shopping areas whereby said mobile computers can communicate with other systems including antennas, peripheral devices, and networks by means of wired connections.

6. The system of claim 5 wherein said location data is provided substantially by said mobile computers with radios to said source of said situation information for information about traffic patterns in said areas whereby traffic data are collected automatically by said radio locating means to aid organization of layout, merchandise, displays, and said user access to said area.

7. The system of claim 6 wherein said mobile computers with radios severally include a substantially separate peripheral device holder functioning as an exclusive satellite of, and communicating by means of photonic media solely with, said mobile computer and substantially containing a speaker, microphone, and one or more photon-related devices, including camera, bar-code reader or infrared devices, whereby information associated with use of said devices is processed by said mobile computer to enable said user to operate said peripherals without physical encumbrance due to the obstructive bulk of said computer, exposure to potentially harmful radiation affects associated with close operation of said radio of said computer, or being prevented from engaging in voice communications simultaneously with the viewing of said visual data appearing on the screen of said computer.

8. A method for conducting shopping functions in shopping areas including stores and malls wherein information is communicated wirelessly by providers of services and merchandise, including offers pertaining to the buying and selling of said services and merchandise, to potential customers severally using mobile computers with radios substantially continually receiving telephone numbers of said providers and obviating the resulting interference imposed by the obligatory answering of a ringing telephone as automated updates occur, comprising the steps of:

a. acting substantially simultaneously with receipt of a gating pulse from a transmitter, transmitting customer information, including identification and location information, severally by said mobile computers with radios, and receiving said identification and location information in said situation information system, b. ascertaining subsequently whether said location information of a selected subset of said mobile computers with radios indicates said computers suitably proximate to said offers, or display thereof, presented by said providers, and c. transmitting one or more said offers including by visual, aural, and other data types and other pertinent information, severally to said subset of said mobile computers with radios according to said customers' selections and contingently dependent on subsequent actions of said customers whereby said customers using said computers with radios can shop more knowledgeably and efficiently.

9. The method of claim 8 wherein said actions of said customers include severally making responses to appropriate offers and subsequently communicating using said mobile computer with radios each of said responses, including bids, counter offers, and purchasing and credit information, to said situation information system associated with providers whereby mutually beneficial commerce is securely and easily conducted.

10. The method of claim 9 wherein said customer information includes data further processed by means selected from the group consisting of options and filters whereby said customers severally receive information, including goods and services information, appropriate to the requirements of said customers.

11. A method of communicatively executing, including making apparent to the aural and tactile senses of the user, one or more transmittable mappable hypertext items representing people, organisms, and objects, including buildings, roads, vehicles, and signs, on a computer in a manner scalably representing interrelationships of said objects, comprising the steps of:

a. searching each of one or more unique mappable information code sequences, each of which said code sequences serving to uniquely represent one of said items and copied from the memory of said computer or received from an alternate source, for a field containing geographical coordinates, said each of said code sequences includes an item reference field, a name field, a location field including said geographical coordinates, and a data field, b. converting said coordinates to an appropriately proportionate representation on said computer, and c. displaying selectably scalably said items on said computer whereby said user may quickly receive and display timely situation information mapped in the context of spatial information, including appropriate to a geographical or other area, in which said mappable hypertext items are quickly received, mapped, and optionally executably selected by said user to provide additional of said situation information or received, stored, and transmitted by a provider of said situation information.

12. The method in claim 11 wherein said interrelationships of said objects are distance quantities separating each of said objects and are represented by mappable hypertext items processed and selectably represented on said computer whereby time and distance to or between objects may be determined and delimited in order to cause additional information to be executed on said computer from sources, including memory and said service provider, and increase the efficiency of said user thereby.

13. The method in claim 12 wherein said mappable hypertext items include a user modifiable location symbol, including providing dynamic characteristics, whereby said user may choose representation by a unique icon on said computer which can be made to execute on others of said computers.

14. A method of receiving in a mobile computer substantially moving relative to locations of timely interest to the user of said computer, including one or more sources of transmitted digital information describing said locations including services and resources currently available at said locations from one or more selectable visit lists of said sources of said information capable of being organized according to said locations' proximity, timeliness, and other criteria into the memory of said computer, substantially continually receiving telephone numbers of providers of said services and resources and obviating the resulting interference imposed by the obligatory answering of a ringing telephone as automated updates occur, comprising the steps of:

a. executing information from a selectably precedent source of said digital information on said mobile computer, including being viewed on a display, b. receiving substantially simultaneously information from subsequently selected of the remaining of said sources of said digital information from said organizable sources on said lists, and c. storing said information from said sources in a retrievable manner in said mobile computer memory for execution selectably alternatively and timely, including preemptively or subsequently, to said information from any of said sources whereby time-critical, location-dependent information transmitted comparatively slowly from multiple sources of said digital information can be received by a traveler using said mobile computer in a timely way while information currently executing is utilized.

15. The method of claim 14 including a keyword search wherein proximate, timely, or desirable sources of said digital information in which keyword terms are found are selectably added to said visit list whereby a user may selectably initiate and alter searches for specific keywords on topics potentially useful to said user, including roadside service locations and other searches, while substantially utilizing said digital information executing on said computer.

* * * * *